United States Patent
Lin

(10) Patent No.: US 9,658,734 B2
(45) Date of Patent: May 23, 2017

(54) INFORMATION PROCESSING METHOD AND ELECTRONIC DEVICE

(71) Applicants: BEIJING LENOVO SOFTWARE LTD., Beijing (CN); LENOVO (BEIJING) LIMITED, Beijing (CN)

(72) Inventor: Lijun Lin, Beijing (CN)

(73) Assignees: Beijing Lenovo Software Ltd., Beijing (CN); Lenovo (Beijing) Limited, Beijing (CN)

( * ) Notice: Subject to any disclaimer, the term of this patent is extended or adjusted under 35 U.S.C. 154(b) by 422 days.

(21) Appl. No.: 14/226,052

(22) Filed: Mar. 26, 2014

(65) Prior Publication Data

US 2015/0234543 A1 Aug. 20, 2015

(30) Foreign Application Priority Data

Feb. 17, 2014 (CN) .......................... 2014 1 0053109
Feb. 17, 2014 (CN) .......................... 2014 1 0053691
Feb. 24, 2014 (CN) .......................... 2014 1 0062757

(51) Int. Cl.
*G06F 3/0481* (2013.01)
*G06F 3/0486* (2013.01)
(Continued)

(52) U.S. Cl.
CPC .......... *G06F 3/0481* (2013.01); *G06F 3/0486* (2013.01); *G06F 3/04883* (2013.01); *G06F 3/04886* (2013.01); *G06F 9/4443* (2013.01)

(58) Field of Classification Search
CPC ... G06F 3/00; G06F 3/01; G06F 3/041; G06F 3/048; G06F 3/0481; G06F 3/0488; G06F 3/04842; G06F 3/04847; G06F 1/1626
See application file for complete search history.

(56) References Cited

U.S. PATENT DOCUMENTS 6,400,376 B1 * 6/2002 Singh .................... G06F 1/1626
345/156
8,438,504 B2 5/2013 Cranfill et al.
(Continued)

FOREIGN PATENT DOCUMENTS

CN 102298503 A 12/2011
CN 102722395 A 10/2012
(Continued)

*Primary Examiner* — Xiomar L Bautista
(74) *Attorney, Agent, or Firm* — Kinney & Lange, P.A.

(57) ABSTRACT

The present invention relates to communication technology and discloses an information processing method and an electronic device. The information processing method is applied in an electronic device. The touch display unit is capable of displaying at least one target object associated with the first application and displaying the first application in a small window or a full-screen window in response to the target object being touched. The full-screen window has a display area equal to an area where the touch display unit can accept a touch event and the small window has a display area smaller than the area where the touch display unit can accept a touch event. The small window is obtained by converting the full-screen window based on a first conversion parameter. The method comprises: receiving a first operation on the touch display unit for initiating and displaying the first application; and displaying the first application in the small window on the touch display unit when the first operation meets a first predetermined operation condition or the first application meets a first predetermined application condition.

20 Claims, 6 Drawing Sheets

(51) Int. Cl.
  *G06F 3/0488* (2013.01)
  *G06F 9/44* (2006.01)

(56) References Cited

U.S. PATENT DOCUMENTS

| | | | | |
|---|---|---|---|---|
| 8,572,515 B2* | 10/2013 | Ainslie | ................... | G06F 3/038 |
| | | | | 345/173 |
| 2009/0046075 A1* | 2/2009 | Kim | ................... | G06F 3/0488 |
| | | | | 345/173 |
| 2011/0019058 A1* | 1/2011 | Sakai | ................... | G06F 3/04847 |
| | | | | 348/333.01 |
| 2011/0205178 A1* | 8/2011 | Yoshida | ............... | G06F 1/1616 |
| | | | | 345/173 |
| 2012/0017167 A1* | 1/2012 | Lee | ................... | G06F 3/04886 |
| | | | | 715/776 |
| 2012/0092397 A1* | 4/2012 | DeLuca | ................... | G09G 5/14 |
| | | | | 345/698 |
| 2012/0110438 A1* | 5/2012 | Peraza | ................. | G06F 17/214 |
| | | | | 715/243 |
| 2012/0113216 A1* | 5/2012 | Seen | ................. | H04N 5/23293 |
| | | | | 348/38 |
| 2013/0141349 A1* | 6/2013 | Song | ....................... | G06F 21/36 |
| | | | | 345/173 |
| 2013/0300682 A1* | 11/2013 | Choi | ................... | H04M 1/0268 |
| | | | | 345/173 |
| 2013/0346912 A1* | 12/2013 | Buening | ............... | G06F 3/0488 |
| | | | | 715/783 |
| 2014/0033119 A1* | 1/2014 | Kim | ....................... | G06F 3/0481 |
| | | | | 715/800 |
| 2014/0040756 A1 | 2/2014 | Bukurak et al. | | |
| 2014/0040768 A1 | 2/2014 | Lazaridis et al. | | |
| 2014/0053097 A1* | 2/2014 | Shin | ....................... | G06F 9/4443 |
| | | | | 715/779 |
| 2014/0184526 A1* | 7/2014 | Cho | ....................... | G06F 3/041 |
| | | | | 345/173 |
| 2015/0205495 A1* | 7/2015 | Koide | ................... | G06F 3/0488 |
| | | | | 715/760 |

FOREIGN PATENT DOCUMENTS

| | | |
|---|---|---|
| CN | 103098001 A | 5/2013 |
| CN | 103324435 A | 9/2013 |
| CN | 103399710 A | 11/2013 |
| CN | 103559055 A | 2/2014 |

* cited by examiner

INFORMATION PROCESSING METHOD AND ELECTRONIC DEVICE

TECHNICAL FIELD

The present invention relates to communication technology, and more particularly, to an information processing method and an electronic device.

BACKGROUND

With the development of mobile terminals, particularly those with screens having higher resolutions and larger sizes, users' demands on multi-window operations gradually arise, e.g., to open multiple windows on a single mobile device, each displaying and executing an application. However, when a user wants to initiate an application in a small window, he/she needs to set an initiation mode for the application and perform a selection operation, such as double-click, before he/she can initiate the application. Sometimes these operations will cause inconvenience in user operation, resulting in inefficient user operation and degraded user experience.

In conventional electronic devices, display windows for different applications are typically of the same size. When the user wants to set the size of the display window for a particular application, he/she needs to initiate the application and adjust the size using an adjustment control or menu. Obviously, these operations are troublesome and the user experience is poor.

SUMMARY

In light of this, it is an object of the present invention to provide an information processing method and an electronic device, capable of selectively displaying an application in a full-screen window or a small window, thereby avoiding troublesome operations and improving user experience.

In order to achieve the above object, the present invention provides the following solutions.

In a first aspect of the present invention, an information processing method is provided. The method is applied in an electronic device having a touch display unit and capable of executing a first application. The touch display unit is capable of displaying the first application in a small window or a full-screen window. The full-screen window has a display area equal to an area where the touch display unit can accept a touch event and the small window has a display area smaller than the area where the touch display unit can accept a touch event. The small window is obtained by converting the full-screen window based on a first conversion parameter. The method comprises: receiving a first operation on the touch display unit for initiating and displaying the first application; and in response to the first operation, displaying the first application in the small window on the touch display unit when the first application meets a first predetermined condition; and displaying the first application in the full-screen window on the touch display unit when the first application meets a second predetermined condition.

Preferably, the first conversion parameter at least comprises one of a single parameter value, a matrix, a parameter group or a parameter set.

Preferably, the method further comprises creating a first predetermined list including one or more applications to be displayed in the small window, or a second predetermined list including one or more applications to be displayed in the full-screen window. The first application meets the first predetermined condition when the first application is included in the first predetermined list, and the first application meets the second predetermined condition when the first application is not included in the first predetermined list. Alternatively, the first application meets the first predetermined condition when the first application is not included in the second predetermined list, and the first application meets the second predetermined condition when the first application is included in the second predetermined list.

Preferably, said creating a first predetermined list or a second predetermined list comprises: receiving a second operation for creating the first predetermined list or a third operation for creating the second predetermined list; parsing the second operation or the third operation to determine M1 applications specified by the second operation or M2 applications specified by the third operation; recording the specified M1 applications to form the first predetermined list, wherein each of the M1 applications, when initiated, is to be displayed in a small window by default; or recording the specified M2 applications to form the second predetermined list, wherein each of the M2 applications, when initiated, is to be displayed in a full-screen window by default, where M1 and M2 are positive integers.

Preferably, said creating a first predetermined list or a second predetermined list comprises: displaying, upon receiving the first operation, a selection dialog box on the touch display unit for a user to select to display the first application in a small window or a full-screen window; receiving a fourth operation on the touch display unit for selecting a window for displaying the first application in the selection dialog box; and editing the first or second predetermined list in response to the fourth operation, so as to add/remove the first application to/from the first or second predetermined list.

Preferably, the first predetermined list includes a default sub-list including one or more applications to be displayed in a small window by default.

In a second aspect of the present invention, an electronic device is provided. The electronic device is capable of executing a first application. The electronic device comprises a touch display unit and a processing unit. The touch display unit is configured to display at least one target object associated with the first application and initiate and display the first application in a small window or a full-screen window in response to the target object being touched. The full-screen window has a display area equal to an area where the touch display unit can accept a touch event and the small window has a display area smaller than the area where the touch display unit can accept a touch event. The small window is obtained by converting the full-screen window based on a first conversion parameter. The touch display unit is further configured to receive a first operation for initiating the first application. The processing unit is configured to, in response to the first operation, generate and transmit a first trigger instruction to the touch display unit when the first application meets a first predetermined condition and generate and transmit a second trigger instruction to the touch display unit when the first application meets a second predetermined condition. The touch display unit is further configured to display the first application in the small window in response to receiving the first trigger instruction and display the first application in the full-screen window in response to receiving the second trigger instruction.

Preferably, the first conversion parameter at least comprises one of a single parameter value, a matrix, a parameter group or a parameter set.

Preferably, the device further comprises a creating unit configured to create a first predetermined list including one or more applications to be displayed in the small window, or a second predetermined list including one or more applications to be displayed in the full-screen window. The processing unit comprises a determining module and an instruction generation and transmission module. The determining module is configured to: determine that the first application meets the first predetermined condition when the first application is included in the first predetermined list, and the first application meets the second predetermined condition when the first application is not included in the first predetermined list; or determine that the first application meets the first predetermined condition when the first application is not included in the second predetermined list, and the first application meets the second predetermined condition when the first application is included in the second predetermined list. The instruction generation and transmission module is configured to transmit the first trigger instruction when the first application meets the first predetermined condition, and to transmit the second trigger instruction when the first application meets the second predetermined condition.

Preferably, the touch display unit is further configured to receive a second operation for creating the first predetermined list or a third operation for creating the second predetermined list. The creating unit is configured to parse the second operation or the third operation to determine M1 applications specified by the second operation or M2 applications specified by the third operation; record the specified M1 applications to form the first predetermined list, wherein each of the M1 applications, when initiated, is to be displayed in a small window by default; or record the specified M2 applications to form the second predetermined list, wherein each of the M2 applications, when initiated, is to be displayed in a full-screen window by default, where M1 and M2 are integers.

Preferably, the touch display unit is further configured to display, upon receiving the first operation, a selection dialog box for a user to select to display the first application in a small window or a full-screen window; and receive a fourth operation for selecting a window for displaying the first application in the selection dialog box. The creating unit is further configured to edit the first or second predetermined list in response to the fourth operation, so as to add/remove the first application to/from the first or second predetermined list.

Preferably, the first predetermined list includes a default sub-list including one or more applications to be displayed in a small window by default.

With the information processing method and electronic device according to the embodiments of the present invention, when a first operation is received, it is determined whether the first application associated with the first operation meets a first predetermined condition or a second predetermined condition. Then it is determined whether to display the first application in a full-screen window or a small window based on which predetermined condition is met by the first application. In this way, an appropriate or user-set display window can be provided for displaying the first application without the need for any adjustment after the first application is initiated, thereby improving the user experience.

It is another object of the present invention to provide an information processing method and an electronic device, capable of displaying a window of a size desired by a user while initiating an application.

In order to achieve the above object, the present invention provides the following solutions.

The present invention provides an information processing method. The method is applied in an electronic device having a touch display unit and capable of executing a first application. The touch display unit is capable of displaying at least one target object associated with the first application and displaying the first application in a small window or a full-screen window in response to the target object being touched. The full-screen window has a display area equal to an area where the touch display unit can accept a touch event and the small window has a display area smaller than the area where the touch display unit can accept a touch event. The small window is obtained by converting the full-screen window based on a first conversion parameter. The method comprises: receiving a first operation on the touch display unit for initiating and displaying the first application; displaying the first application in the small window on the touch display unit in response to the first operation when the first operation meets a first predetermined condition; and displaying the first application in the full-screen window on the touch display unit in response to the first operation when the first operation meets a second predetermined condition.

Preferably, the first conversion parameter at least comprises one of a single parameter value, a matrix, a parameter group or a parameter set.

Preferably, the first operation meets the first predetermined condition when the target object is touched by the first operation for a duration longer than a first predetermined value, and the first operation meets the second predetermined condition when the target object is touched by the first operation for a duration equal to or shorter than the first predetermined value.

Preferably, the first operation meets the first predetermined condition when the target object is touched by the first operation for m times during a predetermined time period, and the first operation meets the second predetermined condition when the target object is touched by the first operation for n times during the predetermined time period, where m and n are different integers.

Preferably, the target object comprises a first region and a second region. The first operation meets the first predetermined condition when the first operation touches a region included in the first region, and the first operation meets the second predetermined condition when the first operation touches a region included in the second region.

Preferably, the first operation is a sliding touch operation on the target object. The first operation meets the first predetermined condition when the first operation slides in a first direction, and the first operation meets the second predetermined condition when the first operation slides in a second direction different from the first direction.

Preferably, the electronic device further comprises a pressure sensor. The first operation is a pressing touch operation on the target object. The first operation meets the first predetermined condition when the first operation has a pressure higher than a second predetermined value, and the first operation meets the second predetermined condition when the first operation has a pressure equal to or lower than the second predetermined value.

In another aspect, the present invention provides an electronic device. The electronic device is capable of executing a first application. The electronic device comprises a touch display unit and a processing unit. The touch display unit is configured to display at least one target object associated with the first application and initiate and display the first application in a small window or a full-screen window in response to the target object being touched. The full-screen window has a display area equal to an area where the touch display unit can accept a touch event and the small window has a display area smaller than the area where the touch display unit can accept a touch event. The small window being obtained by converting the full-screen window based on a first conversion parameter. The touch display unit is further configured to receive a first operation for initiating the first application. The processing unit is configured to, in response to the first operation, generate and transmit a first trigger instruction to the touch display unit when the first operation meets a first predetermined condition, and generate and transmit a second trigger instruction to the touch display unit when the first operation meets a second predetermined condition. Accordingly, the touch display unit is further configured to display the first application in the small window in response to receiving the first trigger instruction and to display the first application in the full-screen window in response to receiving the second trigger instruction.

Preferably, the first conversion parameter at least comprises one of a single parameter value, a matrix, a parameter group or a parameter set.

Preferably, the processing unit comprises a first sensor module configured to detect a duration during which the target object is touched by the first operation; a first judging module configured to judge whether the duration is longer than a first predetermined value; and a first determining module configured to determine that the first operation meets the first predetermined condition when the duration is longer than the first predetermined value, and to determine that the first operation meets the second predetermined condition when the duration is equal to or shorter than the first predetermined value.

Preferably, the processing unit comprises a second sensor module configured to detect a number of times the target object is touched by the first operation during a predetermined time period; a second judging module configured to judge whether the number of times is equal to m or n; and a second determining module configured to determine that the first operation meets the first predetermined condition when the number of times is equal to m, and to determine that the first operation meets the second predetermined condition when the number of times is equal to n, where m and n are different integers.

Preferably, the target object comprises a first region and a second region. The processing unit comprises: a third sensor module configured to detect a region touched by the first operation; a third judging module configured to judge whether the touched region is included in the first region or the second region; and a third determining unit configured to determine that the first operation meets the first predetermined condition when the touched region is included in the first region, and to determine that first operation meets the second predetermined condition when the touched region is included in the second region.

Preferably, the first operation is a sliding touch operation on the target object. The processing unit comprises: a fourth sensor module configured to detect a sliding direction of the first operation; a fourth judging module configured to judge whether the sliding direction is a first direction or a second direction different from the first direction; and a fourth determining unit configured to determine that the first operation meets the first predetermined condition when the sliding direction is the first direction, and to determine that the first operation meets the second predetermined condition when the sliding direction is the second direction.

Preferably, the first operation is a pressing touch operation on the target object. The processing unit comprises: a fifth sensor module configured to detect a pressure of the first operation; a fifth judging module configured to judge whether to the pressure is higher than a third predetermined value; and a fifth determining unit configured to determine that the first operation meets the first predetermined condition when the pressure is higher than the third predetermined value, and to determine that the first operation meets the second predetermined condition when the pressure is equal to or lower than the third predetermined value.

With the information processing method and the electronic device according to the embodiments of the present invention, it is determined whether to open a first application in a full-screen window or a small window by judging whether a first operation meets a first predetermined condition or a second predetermined condition. In this way, a user can open the application in a window of a size desired by the user with a single operation, thereby significantly improving the user experience.

According to another embodiment of the present invention, an information processing method is provided. The method is applied in an electronic device having a touch display unit and capable of executing a plurality of applications. The touch display unit is capable of displaying M target objects each associated with one of M applications, where M is a positive integer. An application is initiated when its associated target object is touched. Each application can be displayed in a full-screen window or a small window on the touch display unit. The small window has a smaller display area than the full-screen window. The small window is obtained by converting the full-screen window based on a first conversion parameter. The method comprises obtaining a first operation on at least one target object on the touch display unit when a first small window is displayed on the touch display unit, the first operation being a dragging operation on the target object on the touch display unit; parsing the first operation to determine its operation path and obtain originating coordinates and terminating coordinates of the operation path; determining a first application associated with the target object; executing and displaying the first application in a small window when the terminating coordinates of the operation path are located within a display region of the first small window.

According to an embodiment of the present invention, an electronic device is provided. The electronic device comprises a touch display unit and a processing unit. The touch display unit is configured to display M target objects each associated with one of M applications in a display region, where M is a positive integer. An application is initiated when its associated target object is touched. Each application can be displayed in a full-screen window or a small window on the touch display unit. The small window has a smaller display area than the full-screen window. The small window is obtained by converting the full-screen window based on a first conversion parameter. A first operation on at least one target object is obtained when a first small window is displayed on the touch display unit. The first operation is a dragging operation on the target object. The processing unit is configured to: parse the first operation to determine its operation path and obtain originating coordinates and terminating coordinates of the operation path; determine a first application associated with the target object; and generate and transmit a first trigger instruction to the touch display unit to cause the touch display unit to execute and display the first application in a small window when the terminating coordinates of the operation path are located within a display region of the first small window.

With the information processing method and the electronic device according to the embodiments of the present invention, the user is provided with a new approach for initiating an application, i.e., initiating an application directly in a small window at a position specified by the user's operation. In this way, operations such as selecting an initiating mode and selecting a position to open a small window can be omitted, thereby ensuring operation convenience, improving operation efficiency and enhancing user experience.

DETAILED DESCRIPTION OF THE EMBODIMENTS

In the following, the solutions of the present invention will be further detailed with reference to the figures and embodiments.

1$^{st}$ Embodiment

Figure 1:
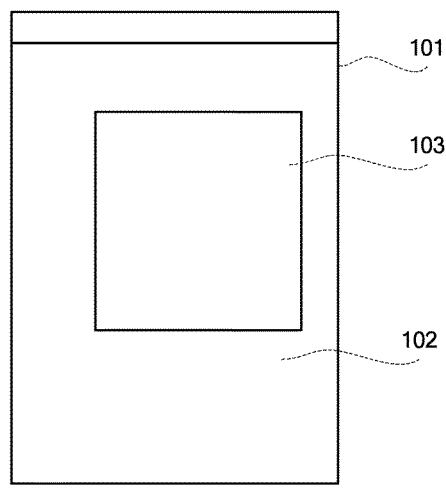
FIG. 1 is a schematic diagram showing a first display effect according to an embodiment of the present invention.
Figure 2:
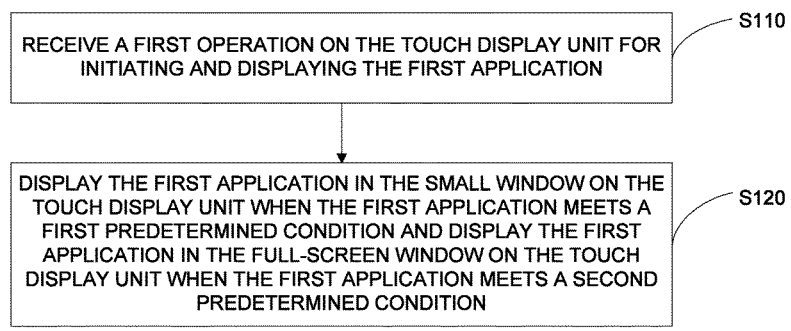
FIG. 2 is a flowchart illustrating an information processing method according to an embodiment of the present invention.

In this embodiment, an information processing method is provided. The method is applied in an electronic device having a touch display unit and capable of executing a first application. The touch display unit is capable of displaying the first application in a small window or a full-screen window. As shown in FIG. 1, the full-screen window 102 has a display area equal to an area where the touch display unit 101 can accept a touch event and the small window 103 has a display area smaller than the area where the touch display unit 101 can accept a touch event. That is, the display area of the small window is smaller than that of the full-screen window. The small window is obtained by converting the full-screen window based on a first conversion parameter. As shown in FIG. 2, the method includes the following steps.

At step S110, a first operation is received on the touch display unit for initiating to and displaying the first application.

At step S120, in response to the first operation, the first application is displayed in the small window on the touch display unit when the first application meets a first predetermined condition or in the full-screen window on the touch display unit when the first application meets a second predetermined condition.

Here, the first conversion parameter may be one of a single parameter value, a matrix, a parameter group or a parameter set. The parameter may be a single parameter value, e.g., a ratio of the display area of the small window to the display area of the full-screen window. The parameter group may be a two-tuple that includes two parameters, one being a ratio of the small window to the full-screen window in a first direction and the other being a ratio of the small window to the full-screen window in a second direction perpendicular to the first direction.

The full-screen window can be converted into the small window based on the first conversion parameter by:

reading graphic buffer data associated with the first application;

converting the read graphic buffer data based on the first conversion parameter;

generating frame buffer data for the touch display unit based on the graphic buffer data; and displaying the small window for the first application on the touch display unit based on the frame buffer data.

Here the graphic buffer data may include coordinate information of each pixel and RGB (Red Green Blue) information of each pixel.

Since small windows associated with respective applications may partly overlap each other, the coordinate information of each pixel in the graphic buffer data for the small window associated with each application can be represented as three dimensional (3D) coordinates $x_o$, $y_o$, $z_o$). Here, different small windows have different third dimension coordinates $z_o$. Thus, when two small windows overlap each other partly or even completely, they can be distinguished based their different third dimension coordinates.

The first conversion parameter may be a matrix, e.g., a unit matrix. The small window for the first application can be obtained by converting the extended 3D coordinates $x_o$, $y_o$, $z_o$) in the graphic buffer data based on the first conversion parameter. The graphic buffer data associated with the small window includes the converted coordinates $x_o$, $y_o$, $z_o$) and the RGB information for the respective pixels.

In this way, the full-screen window can be converted into the small window based on the conversion matrix, so as to provide the user with the small window associated with the application and enable the user to view the content of the application executed in any small window flexibly.

Preferably, various adjustments can be applied to a small window by adjusting the conversion matrix associated with the small window.

For example, in order to scale down a small window by a factor of N, where N is an integer larger than 1, the conversion matrix associated with the small window can be changed into $$\begin{pmatrix} 1/N & 0 & 0 \\ 0 & 1/N & 0 \\ 0 & 0 & 1/N \end{pmatrix}$$

in response. In this case, the 3D coordinates $x_t$, $y_t$, $z_t$) of the individual pixels in the frame buffer data associated with the small window will become:

$$x_t, y_t, z_t) = \begin{pmatrix} 1/N & 0 & 0 \\ 0 & 1/N & 0 \\ 0 & 0 & 1/N \end{pmatrix} \times \begin{pmatrix} x_o \\ y_o \\ z_o \end{pmatrix}.$$

Then, in order to further move the small window by $\Delta x$ laterally and by $\Delta y$ longitudinally, the conversion matrix associated with the small window can be changed into $$\begin{pmatrix} 1/N & 0 & \Delta x \\ 0 & 1/N & \Delta y \\ 0 & 0 & 1/N \end{pmatrix}.$$

In this case, the 3D coordinates $x_t$, $y_t$, $z_t$) of the individual pixels in the frame buffer data associated with the small window will become:

$$x_t, y_t, z_t) = \begin{pmatrix} 1/N & 0 & \Delta x \\ 0 & 1/N & \Delta y \\ 0 & 0 & 1/N \end{pmatrix} \times \begin{pmatrix} x_o \\ y_o \\ z_o \end{pmatrix}.$$

In an embodiment, the size of the small window can be configured by changing the first conversion parameter as desired.

There are various settings for the parameter, matrix, parameter group and parameter set and the details thereof will be omitted here.

In using an electronic device, some applications, such as a calculator or a calendar, are suitable to be opened in a small window and some applications, such as a video viewer application or an image reader application, are suitable to be opened in a full-screen window. By opening the video viewer application or the image reader application in the full-screen window, viewing or reading fatigue can be reduced.

The first application is suitable to be opened in a small window, or is set by the user to be opened in a small window when it meets the first predetermined condition. On the other hand, the first application is suitable to be opened in a full-screen window, or is set by the user to be opened in a full-screen window when it meets the second predetermined condition. In this embodiment, it is determined whether to open the first application in a small window or in a full-screen window based on which of the conditions is met by the first application. In this way, the user can be provided with an improved interface for viewing, reading or operating, thereby improving the user experience.

2$^{nd}$ Embodiment

In this embodiment, an information processing method is provided. The method is applied in an electronic device having a touch display unit and capable of executing a first application. The touch display unit is capable of displaying the first application in a small window or a full-screen window. As shown in FIG. 1, the full-screen window 102 has a display area equal to an area where the touch display unit 101 can accept a touch event and the small window 103 has a display area smaller than the area where the touch display unit 101 can accept a touch event. That is, the display area of the small window is smaller than that of the full-screen window. The small window is obtained by converting the full-screen window based on a first conversion parameter. As shown in FIG. 2, the method includes the following steps.

At step S110, a first operation is received on the touch display unit for initiating and displaying the first application.

At step S120, in response to the first operation, the first application is displayed in the small window on the touch display unit when the first application meets a first predetermined condition or in the full-screen window on the touch display unit when the first application meets a second predetermined condition.

Here, the first conversion parameter may be one of a single parameter value, a matrix, a parameter group or a parameter set. The parameter may be a single parameter value, e.g., a ratio of the display area of the small window to the display area of the full-screen window. The parameter group may be a two-tuple that includes two parameters, one being a ratio of the small window to the full-screen window in a first direction and the other being a ratio of the small window to the full-screen window in a second direction perpendicular to the first direction.

The full-screen window can be converted into the small window based on the first conversion parameter by:

reading graphic buffer data associated with the first application;

converting the read graphic buffer data based on the first conversion parameter;

generating frame buffer data for the touch display unit based on the graphic buffer data; and displaying the small window for the first application on the touch display unit based on the frame buffer data.

Here the graphic buffer data may include coordinate information of each pixel and RGB (Red Green Blue) information of each pixel.

Since small windows associated with respective applications may partly overlap each other, the coordinate information of each pixel in the graphic buffer data for the small window associated with each application can be represented as three dimensional (3D) coordinates $x_o$, $y_o$, $z_o$). Here, different small windows have different third dimension coordinates $z_o$. Thus, when two small windows overlap each other partly or even completely, they can be distinguished based their different third dimension coordinates.

The first conversion parameter may be a matrix, e.g., a unit matrix. The small window for the first application can be obtained by converting the extended 3D coordinates $x_o$, $y_o$, $z_o$) in the graphic buffer data based on the first conversion parameter. The graphic buffer data associated with the small window includes the converted coordinates $x_o$, $y_o$, $z_o$) and the RGB information for the respective pixels.

In this way, the full-screen window can be converted into the small window based on the conversion matrix, so as to provide the user with the small window associated with the application and enable the user to view the content of the application executed in any small window flexibly.

Preferably, various adjustments can be applied to a small window by adjusting the conversion matrix associated with the small window.

For example, in order to scale down a small window by a factor of N, where N is an integer larger than 1, the conversion matrix associated with the small window can be changed into $$\begin{pmatrix} 1/N & 0 & 0 \\ 0 & 1/N & 0 \\ 0 & 0 & 1/N \end{pmatrix}$$

in response. In this case, the 3D coordinates $x_t$, $y_t$, $z_t$) of the individual pixels in the frame buffer data associated with the small window will become:

$$x_t, y_t, z_t) = \begin{pmatrix} 1/N & 0 & 0 \\ 0 & 1/N & 0 \\ 0 & 0 & 1/N \end{pmatrix} \times \begin{pmatrix} x_o \\ y_o \\ z_o \end{pmatrix}.$$

Then, in order to further move the small window by $\Delta x$ laterally and by $\Delta y$ longitudinally, the conversion matrix associated with the small window can be changed into $$\begin{pmatrix} 1/N & 0 & \Delta x \\ 0 & 1/N & \Delta y \\ 0 & 0 & 1/N \end{pmatrix}.$$

In this case, the 3D coordinates $x_t$, $y_t$, $z_t$) of the individual pixels in the frame buffer data associated with the small window will become:

$$x_t, y_t, z_t) = \begin{pmatrix} 1/N & 0 & \Delta x \\ 0 & 1/N & \Delta y \\ 0 & 0 & 1/N \end{pmatrix} \times \begin{pmatrix} x_o \\ y_o \\ z_o \end{pmatrix}.$$

In an embodiment, the size of the small window can be configured by changing the first conversion parameter as desired.

There are various settings for the parameter, matrix, parameter group and parameter set and the details thereof will be omitted here.

A first predetermined list includes one or more applications to be displayed in the small window. A second predetermined list includes one or more applications to be displayed in the full-screen window. In an embodiment, at least one of the first and second predetermined lists is stored in the electronic device. In an embodiment, each of the first and second predetermined lists stores identification information or field that can uniquely identify an application, such as an application identification number or an application name of the first application.

There are at least the following two schemes for determining whether the first application meets the first predetermined condition or the second predetermined condition.

In the first scheme, it is determined that the first application meets the first predetermined condition when the first application is included in the first predetermined list, and that the first application meets the second predetermined condition when the first application is not included in the first predetermined list.

In the second scheme, it is determined that the first application meets the first predetermined condition when the first application is not included in the second predetermined list, and that the first application meets the second predetermined condition when the first application is included in the second predetermined list.

Alternatively, it can be determined that the first application meets the first predetermined condition when the first application is included in the first predetermined list, and that the first application meets the second predetermined condition when the first application is included in the second predetermined list. When the first application is included in neither of the first and second predetermined lists, a further process can be applied, in which it is determined whether to display the first application in the full-screen window or in the small window based on which window is most recently used for the first application, or based on a default window for the first application (which can be the full-screen window or the small window). Moreover, prompt information and/or a dialog box for selecting to display the application in the full-screen window or the small window can be provided to the user on the touch display unit.

It can be set by the user or selected based on a pre-stored policy whether to select the first or the second scheme. In order to make this selection, the number of applications included in the first predetermined list can be compared with the number of applications included in the second predetermined list and the list including fewer applications can be selected as the list to be searched. For example, when the first predetermined list includes fewer applications than the second predetermined list, it can be determined whether the first predetermined condition is met based on whether the first application is included in the first predetermined list. Alternatively, when the second predetermined list includes fewer applications than the first predetermined list, it can be determined whether the second predetermined condition is met based on whether the first application is included in the second predetermined list.

This embodiment differs from the $1^{st}$ embodiment in that it provides particular schemes for determining whether the first application meets the first or the second predetermined condition while also achieving the advantage of improving user experience.

$3^{rd}$ Embodiment

In this embodiment, an information processing method is provided. The method is applied in an electronic device having a touch display unit and capable of executing a first application. The touch display unit is capable of displaying the first application in a small window or a full-screen window. As shown in FIG. 1, the full-screen window 102 has a display area equal to an area where the touch display unit 101 can accept a touch event and the small window 103 has a display area smaller than the area where the touch display unit 101 can accept a touch event. That is, the display area of the small window is smaller than that of the full-screen window. The small window is obtained by converting the full-screen window based on a first conversion parameter. As shown in FIG. 2, the method includes the following steps.

At step S110, a first operation is received on the touch display unit for initiating and displaying the first application.

At step S120, in response to the first operation, the first application is displayed in the small window on the touch display unit when the first application meets a first predetermined condition or in the full-screen window on the touch display unit when the first application meets a second predetermined condition.

Here, the first conversion parameter may be one of a single parameter value, a matrix, a parameter group or a parameter set. The parameter may be a single parameter value, e.g., a ratio of the display area of the small window to the display area of the full-screen window. The parameter group may be a two-tuple that includes two parameters, one being a ratio of the small window to the full-screen window in a first direction and the other being a ratio of the small window to the full-screen window in a second direction perpendicular to the first direction.

The full-screen window can be converted into the small window based on the first conversion parameter by:

reading graphic buffer data associated with the first application;

converting the read graphic buffer data based on the first conversion parameter;

generating frame buffer data for the touch display unit based on the graphic buffer data; and displaying the small window for the first application on the touch display unit based on the frame buffer data.

Here the graphic buffer data may include coordinate information of each pixel and RGB (Red Green Blue) information of each pixel.

Since small windows associated with respective applications may partly overlap each other, the coordinate information of each pixel in the graphic buffer data for the small window associated with each application can be represented as three dimensional (3D) coordinates $x_o$, $y_o$, $z_o$. Here, different small windows have different third dimension coordinates $z_o$. Thus, when two small windows overlap each other partly or even completely, they can be distinguished based their different third dimension coordinates.

The first conversion parameter may be a matrix, e.g., a unit matrix. The small window for the first application can be obtained by converting the extended 3D coordinates $x_o$, $y_o$, $z_o$ in the graphic buffer data based on the first conversion parameter. The graphic buffer data associated with the small window includes the converted coordinates $x_o$, $y_o$, $z_o$ and the RGB information for the respective pixels.

In this way, the full-screen window can be converted into the small window based on the conversion matrix, so as to provide the user with the small window associated with the application and enable the user to view the content of the application executed in any small window flexibly.

Preferably, various adjustments can be applied to a small window by adjusting the conversion matrix associated with the small window.

For example, in order to scale down a small window by a factor of N, where N is an integer larger than 1, the conversion matrix associated with the small window can be changed into $$\begin{pmatrix} 1/N & 0 & 0 \\ 0 & 1/N & 0 \\ 0 & 0 & 1/N \end{pmatrix}$$

in response. In this case, the 3D coordinates $x_t$, $y_t$, $z_t$ of the individual pixels in the frame buffer data associated with the small window will become:

$$(x_t, y_t, z_t) = \begin{pmatrix} 1/N & 0 & 0 \\ 0 & 1/N & 0 \\ 0 & 0 & 1/N \end{pmatrix} \times \begin{pmatrix} x_o \\ y_o \\ z_o \end{pmatrix}.$$

Then, in order to further move the small window by $\Delta x$ laterally and by $\Delta y$ longitudinally, the conversion matrix associated with the small window can be changed into $$\begin{pmatrix} 1/N & 0 & \Delta x \\ 0 & 1/N & \Delta y \\ 0 & 0 & 1/N \end{pmatrix}.$$

In this case, the 3D coordinates $x_t$, $y_t$, $z_t$ of the individual pixels in the frame buffer data associated with the small window will become:

$$(x_t, y_t, z_t) = \begin{pmatrix} 1/N & 0 & \Delta x \\ 0 & 1/N & \Delta y \\ 0 & 0 & 1/N \end{pmatrix} \times \begin{pmatrix} x_o \\ y_o \\ z_o \end{pmatrix}.$$

In an embodiment, the size of the small window can be configured by changing the first conversion parameter as desired.

There are various settings for the parameter, matrix, parameter group and parameter set and the details thereof will be omitted here.

A first predetermined list includes one or more applications to be displayed in the small window. A second predetermined list includes one or more applications to be displayed in the full-screen window. In an embodiment, at least one of the first and second predetermined lists is stored in the electronic device.

There are at least the following two schemes for determining whether the first application meets the first predetermined condition or the second predetermined condition.

In the first scheme, it is determined that the first application meets the first predetermined condition when the first application is included in the first predetermined list, and that the first application meets the second predetermined condition when the first application is not included in the first predetermined list.

In the second scheme, it is determined that the first application meets the first predetermined condition when the first application is not included in the second predetermined list, and that the first application meets the second predetermined condition when the first application is included in the second predetermined list.

Alternatively, it can be determined that the first application meets the first predetermined condition when the first application is included in the first predetermined list, and that the first application meets the second predetermined condition when the first application is included in the second predetermined list. When the first application is included in neither of the first and second predetermined lists, a further process can be applied, in which it is determined whether to display the first application in the full-screen window or in the small window based on which window is most recently used for the first application, or based on a default window for the first application (which can be the full-screen window or the small window). Moreover, prompt information and/or a dialog box for selecting to display the application in the full-screen window or the small window can be provided to the user on the touch display unit.

It can be set by the user or selected based on a pre-stored policy whether to select the first or the second scheme. In order to make this selection, the number of applications included in the first predetermined list can be compared with the number of applications included in the second predetermined list and the list including fewer applications can be selected as the list to be searched. For example, when the first predetermined list includes fewer applications than the second predetermined list, it can be determined whether the first predetermined condition is met based on whether the first application is included in the first predetermined list. Alternatively, when the second predetermined list includes fewer applications than the first predetermined list, it can be determined whether the second predetermined condition is met based on whether the first application is included in the second predetermined list.

Figure 3:
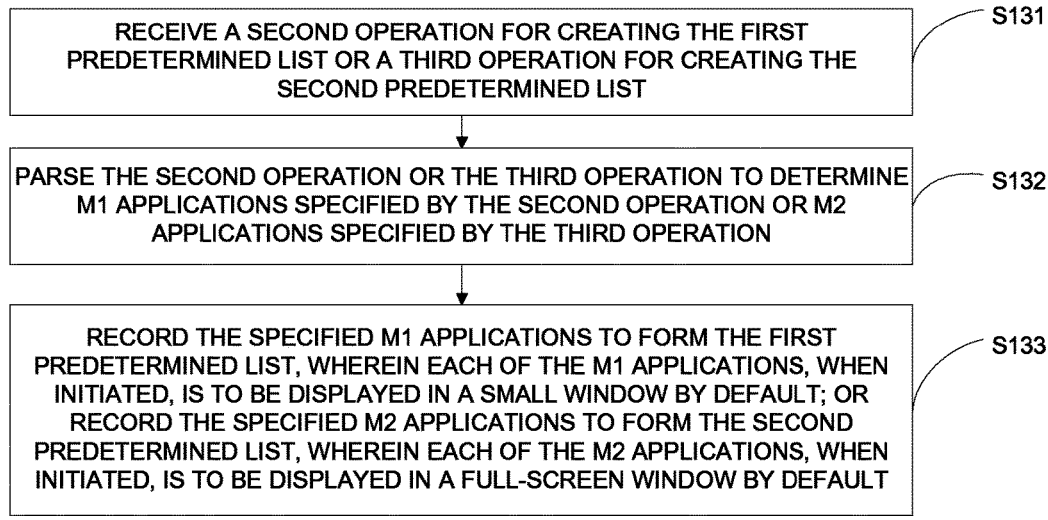
FIG. 3 is a flowchart illustrating a first process for creating a first predetermined list or a second predetermined list according to an embodiment of the present invention.

As a further improvement made by this embodiment, as shown in FIG. 3, the step of creating a first predetermined list or a second predetermined list includes the following steps.

At step S131, a second operation for creating the first predetermined list or a third operation for creating the second predetermined list is received.

At step S132, the second operation or the third operation is parsed to determine M1 applications specified by the second operation or M2 applications specified by the third operation.

At step S133, the specified M1 applications are recorded to form the first predetermined list. Each of the M1 applications, when initiated, is to be displayed in a small window by default. Alternatively, the specified M2 applications are recorded to form the second predetermined list. Each of the M2 applications, when initiated, is to be displayed in a full-screen window by default. Here M1 and M2 are positive integers.

Each of the second and third operations can be an operation based on a selection dialog box or a menu. For a user operation based on a selection dialog box, the electronic device can determine whether the user operation is the second operation or the third operation based on the contents in the selection dialog box and the user's selection operation. For an operation based on a menu, a list of configurable applications can be provided in the menu and the user can check each of the applications. When the menu is a small window display setting menu, the user's checking operation can be considered as the second operation and the checked applications will be recorded to form the first predetermined list.

Compared with the $2^{nd}$ embodiment, this embodiment provides a preferred scheme for creating the second and third predetermined lists with simple operations. The user can configure the device manually, which improves the user control on the device.

$4^{th}$ Embodiment

In this embodiment, an information processing method is provided. The method is applied in an electronic device having a touch display unit and capable of executing a first application. The touch display unit is capable of displaying the first application in a small window or a full-screen window. As shown in FIG. 1, the full-screen window 102 has a display area equal to an area where the touch display unit 101 can accept a touch event and the small window 103 has a display area smaller than the area where the touch display unit 101 can accept a touch event. That is, the display area of the small window is smaller than that of the full-screen window. The small window is obtained by converting the full-screen window based on a first conversion parameter. As shown in FIG. 2, the method includes the following steps.

At step S110, a first operation is received on the touch display unit for initiating and displaying the first application.

At step S120, in response to the first operation, the first application is displayed in the small window on the touch display unit when the first application meets a first predetermined condition or in the full-screen window on the touch display unit when the first application meets a second predetermined condition.

Here, the first conversion parameter may be one of a single parameter value, a matrix, a parameter group or a parameter set. The parameter may be a single parameter value, e.g., a ratio of the display area of the small window to the display area of the full-screen window. The parameter group may be a two-tuple that includes two parameters, one being a ratio of the small window to the full-screen window in a first direction and the other being a ratio of the small window to the full-screen window in a second direction perpendicular to the first direction.

The full-screen window can be converted into the small window based on the first conversion parameter by:

reading graphic buffer data associated with the first application;

converting the read graphic buffer data based on the first conversion parameter;

generating frame buffer data for the touch display unit based on the graphic buffer data; and displaying the small window for the first application on the touch display unit based on the frame buffer data.

Here the graphic buffer data may include coordinate information of each pixel and RGB (Red Green Blue) information of each pixel.

Since small windows associated with respective applications may partly overlap each other, the coordinate information of each pixel in the graphic buffer data for the small window associated with each application can be represented as three dimensional (3D) coordinates $x_o$, $y_o$, $z_o$). Here, different small windows have different third dimension coordinates $z_o$. Thus, when two small windows overlap each other partly or even completely, they can be distinguished based their different third dimension coordinates.

The first conversion parameter may be a matrix, e.g., a unit matrix. The small window for the first application can be obtained by converting the extended 3D coordinates $x_o$, $y_o$, $z_o$) in the graphic buffer data based on the first conversion parameter. The graphic buffer data associated with the small window includes the converted coordinates $x_o$, $y_o$, $z_o$) and the RGB information for the respective pixels.

In this way, the full-screen window can be converted into the small window based on the conversion matrix, so as to provide the user with the small window associated with the application and enable the user to view the content of the application executed in any small window flexibly.

Preferably, various adjustments can be applied to a small window by adjusting the conversion matrix associated with the small window.

For example, in order to scale down a small window by a factor of N, where N is an integer larger than 1, the conversion matrix associated with the small window can be changed into $$\begin{pmatrix} 1/N & 0 & 0 \\ 0 & 1/N & 0 \\ 0 & 0 & 1/N \end{pmatrix}$$

in response. In this case, the 3D coordinates $x_t$, $y_t$, $z_t$) of the individual pixels in the frame buffer data associated with the small window will become:

$$(x_t, y_t, z_t) = \begin{pmatrix} 1/N & 0 & 0 \\ 0 & 1/N & 0 \\ 0 & 0 & 1/N \end{pmatrix} \times \begin{pmatrix} x_o \\ y_o \\ z_o \end{pmatrix}.$$

Then, in order to further move the small window by Δx laterally and by Δy longitudinally, the conversion matrix associated with the small window can be changed into $$\begin{pmatrix} 1/N & 0 & \Delta x \\ 0 & 1/N & \Delta y \\ 0 & 0 & 1/N \end{pmatrix}.$$

In this case, the 3D coordinates $x_t$, $y_t$, $z_t$) of the individual pixels in the frame buffer data associated with the small window will become:

$$(x_t, y_t, z_t) = \begin{pmatrix} 1/N & 0 & \Delta x \\ 0 & 1/N & \Delta y \\ 0 & 0 & 1/N \end{pmatrix} \times \begin{pmatrix} x_o \\ y_o \\ z_o \end{pmatrix}.$$

In an embodiment, the size of the small window can be configured by changing the first conversion parameter as desired.

There are various settings for the parameter, matrix, parameter group and parameter set and the details thereof will be omitted here.

A first predetermined list includes one or more applications to be displayed in the small window. A second predetermined list includes one or more applications to be displayed in the full-screen window. In an embodiment, at least one of the first and second predetermined lists is stored in the electronic device.

There are at least the following two schemes for determining whether the first application meets the first predetermined condition or the second predetermined condition.

In the first scheme, it is determined that the first application meets the first predetermined condition when the first application is included in the first predetermined list, and that the first application meets the second predetermined condition when the first application is not included in the first predetermined list.

In the second scheme, it is determined that the first application meets the first predetermined condition when the first application is not included in the second predetermined list, and that the first application meets the second predetermined condition when the first application is included in the second predetermined list.

Alternatively, it can be determined that the first application meets the first predetermined condition when the first application is included in the first predetermined list, and that the first application meets the second predetermined condition when the first application is included in the second predetermined list. When the first application is included in neither of the first and second predetermined lists, a further process can be applied, in which it is determined whether to display the first application in the full-screen window or in the small window based on which window is most recently used for the first application, or based on a default window for the first application (which can be the full-screen window or the small window). Moreover, prompt information and/or a dialog box for selecting to display the application in the full-screen window or the small window can be provided to the user on the touch display unit.

It can be set by the user or selected based on a pre-stored policy whether to select the first or the second scheme. In order to make this selection, the number of applications included in the first predetermined list can be compared with the number of applications included in the second predetermined list and the list including fewer applications can be selected as the list to be searched. For example, when the first predetermined list includes fewer applications than the second predetermined list, it can be determined whether the first predetermined condition is met based on whether the first application is included in the first predetermined list. Alternatively, when the second predetermined list includes fewer applications than the first predetermined list, it can be determined whether the second predetermined condition is met based on whether the first application is included in the second predetermined list.

Figure 4:
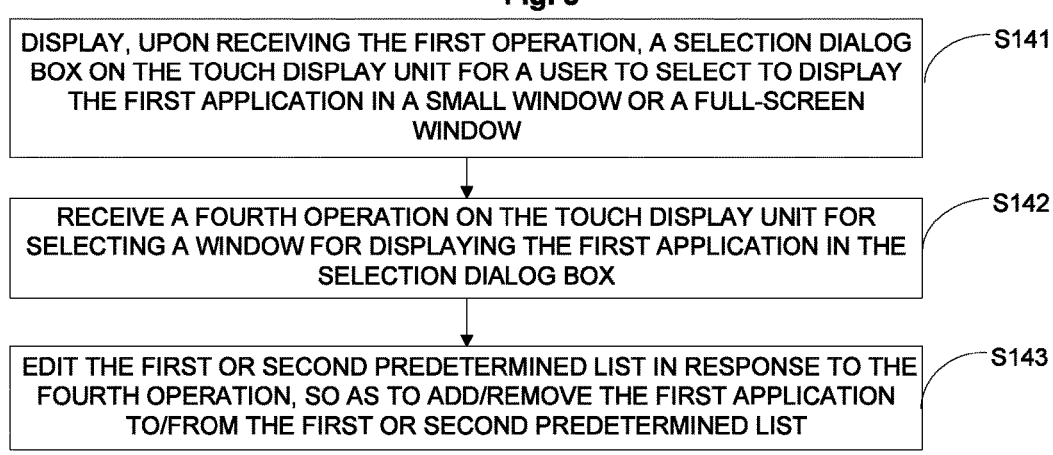
FIG. 4 is a flowchart illustrating a second process for creating a first predetermined list or a second predetermined list according to an embodiment of the present invention.

As shown in FIG. 4, the step of creating a first predetermined list or a second predetermined list includes the following steps.

At step S141, upon receiving the first operation, a selection dialog box is displayed on the touch display unit for a user to select to display the first application in a small window or a full-screen window.

At step S142, a fourth operation is received on the touch display unit for selecting a window for displaying the first application in the selection dialog box.

At step S143, the first or second predetermined list is edited in response to the fourth operation, so as to add/remove the first application to/from the first or second predetermined list.

With the steps S141-S143 in this embodiment, the first predetermined condition and/or the second predetermined condition are formed before the determination associated with the first application is made in the step S120. The method of this embodiment allows adjusting the window displaying of the first application at any time.

In an implementation, the method of this embodiment can be combined with the method according to the $3^{rd}$ embodiment. The steps S141-S143 can be used for applications for which it is not specified by the user or the factory settings whether they are to be opened in a small window or in a full-screen window.

$5^{th}$ Embodiment

In this embodiment, an information processing method is provided. The method is applied in an electronic device having a touch display unit and capable of executing a first application. The touch display unit is capable of displaying the first application in a small window or a full-screen window. As shown in FIG. 1, the full-screen window 102 has a display area equal to an area where the touch display unit 101 can accept a touch event and the small window 103 has a display area smaller than the area where the touch display unit 101 can accept a touch event. That is, the display area of the small window is smaller than that of the full-screen window. The small window is obtained by converting the full-screen window based on a first conversion parameter. As shown in FIG. 2, the method includes the following steps.

At step S110, a first operation is received on the touch display unit for initiating and displaying the first application.

At step S120, in response to the first operation, the first application is displayed in the small window on the touch display unit when the first application meets a first predetermined condition or in the full-screen window on the touch display unit when the first application meets a second predetermined condition.

Here, the first conversion parameter may be one of a single parameter value, a matrix, a parameter group or a parameter set. The parameter may be a single parameter value, e.g., a ratio of the display area of the small window to the display area of the full-screen window. The parameter group may be a two-tuple that includes two parameters, one being a ratio of the small window to the full-screen window in a first direction and the other being a ratio of the small window to the full-screen window in a second direction perpendicular to the first direction.

The full-screen window can be converted into the small window based on the first conversion parameter by:

reading graphic buffer data associated with the first application;

converting the read graphic buffer data based on the first conversion parameter;

generating frame buffer data for the touch display unit based on the graphic buffer data; and displaying the small window for the first application on the touch display unit based on the frame buffer data.

Here the graphic buffer data may include coordinate information of each pixel and RGB (Red Green Blue) information of each pixel.

Since small windows associated with respective applications may partly overlap each other, the coordinate information of each pixel in the graphic buffer data for the small window associated with each application can be represented as three dimensional (3D) coordinates $x_o$, $y_o$, $z_o$). Here, different small windows have different third dimension coordinates $z_o$. Thus, when two small windows overlap each other partly or even completely, they can be distinguished based their different third dimension coordinates.

The first conversion parameter may be a matrix, e.g., a unit matrix. The small window for the first application can be obtained by converting the extended 3D coordinates $x_o$, $y_o$, $z_o$) in the graphic buffer data based on the first conversion parameter. The graphic buffer data associated with the small window includes the converted coordinates $x_o$, $y_o$, $z_o$) and the RGB information for the respective pixels.

In this way, the full-screen window can be converted into the small window based on the conversion matrix, so as to provide the user with the small window associated with the application and enable the user to view the content of the application executed in any small window flexibly.

Preferably, various adjustments can be applied to a small window by adjusting the conversion matrix associated with the small window.

For example, in order to scale down a small window by a factor of N, where N is an integer larger than 1, the conversion matrix associated with the small window can be changed into $$\begin{pmatrix} 1/N & 0 & 0 \\ 0 & 1/N & 0 \\ 0 & 0 & 1/N \end{pmatrix}$$

in response. In this case, the 3D coordinates $x_t$, $y_t$, $z_t$) of the individual pixels in the frame buffer data associated with the small window will become:

$$(x_t, y_t, z_t) = \begin{pmatrix} 1/N & 0 & 0 \\ 0 & 1/N & 0 \\ 0 & 0 & 1/N \end{pmatrix} \times \begin{pmatrix} x_o \\ y_o \\ z_o \end{pmatrix}.$$

Then, in order to further move the small window by $\Delta x$ laterally and by $\Delta y$ longitudinally, the conversion matrix associated with the small window can be changed into $$\begin{pmatrix} 1/N & 0 & \Delta x \\ 0 & 1/N & \Delta y \\ 0 & 0 & 1/N \end{pmatrix}.$$

In this case, the 3D coordinates $x_t$, $y_t$, $z_t$) of the individual pixels in the frame buffer data associated with the small window will become:

$$(x_t, y_t, z_t) = \begin{pmatrix} 1/N & 0 & \Delta x \\ 0 & 1/N & \Delta y \\ 0 & 0 & 1/N \end{pmatrix} \times \begin{pmatrix} x_o \\ y_o \\ z_o \end{pmatrix}.$$

In an embodiment, the size of the small window can be configured by changing the first conversion parameter as desired.

There are various settings for the parameter, matrix, parameter group and to parameter set and the details thereof will be omitted here.

A first predetermined list includes one or more applications to be displayed in the small window. A second predetermined list includes one or more applications to be displayed in the full-screen window. In an embodiment, at least one of the first and second predetermined lists is stored in the electronic device.

There are at least the following two schemes for determining whether the first application meets the first predetermined condition or the second predetermined condition.

In the first scheme, it is determined that the first application meets the first predetermined condition when the first application is included in the first predetermined list, and that the first application meets the second predetermined condition when the first application is not included in the first predetermined list.

In the second scheme, it is determined that the first application meets the first predetermined condition when the first application is not included in the second predetermined list, and that the first application meets the second predetermined condition when the first application is included in the second predetermined list.

Here, the first predetermined list includes a default sub-list including one or more applications to be displayed in a small window by default. Some applications in the electronic device, such as a calculator, can be always displayed in a small window. Thus, these applications can be included in a default list as the default sub-list of the first predetermined list during manufacture of the device.

It can be set by the user or selected based on a pre-stored policy whether to select the first or the second scheme. In order to make this selection, the number of applications included in the first predetermined list can be compared with the number of applications included in the second predetermined list and the list including fewer applications can be selected as the list to be searched. For example, when the first predetermined list includes fewer applications than the second predetermined list, it can be determined whether the first predetermined condition is met based on whether the first application is included in the first predetermined list. Alternatively, when the second predetermined list includes fewer applications than the first predetermined list, it can be determined whether the second predetermined condition is met based on whether the first application is included in the second predetermined list.

In the information processing methods according to the $2^{nd}$ to $5^{th}$ embodiments, the first predetermined list can include a default sub-list. By setting the default sub-list, the applications suitable to be displayed in a small window can be configured in the first predetermined list without manual configuration by the user. In this way, the user operation can be further simplified and the user experience can be improved.

$6^{th}$ Embodiment

Figure 5:
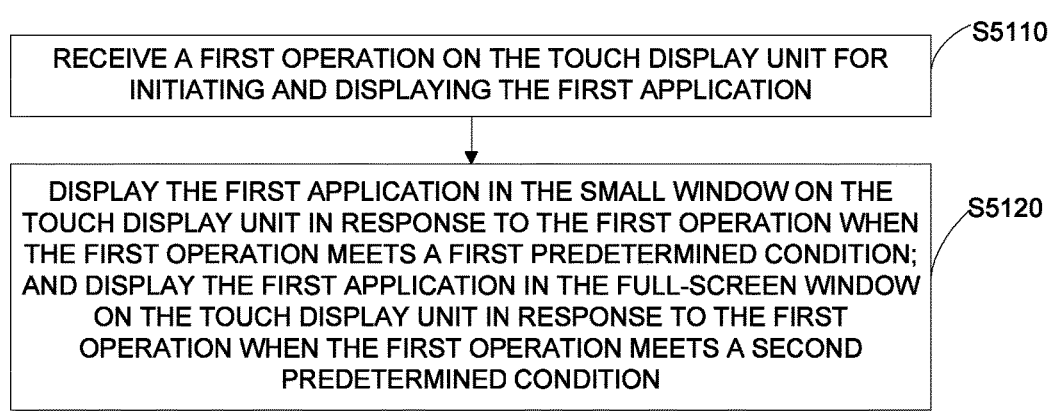
FIG. 5 is another flowchart illustrating an information processing method to according to an embodiment of the present invention.

In this embodiment, an information processing method is provided. The method is applied in an electronic device having a touch display unit and capable of executing a first application. The touch display unit is capable of displaying at least one target object associated with the first application and displaying the first application in a small window or a full-screen window in response to the target object being touched. As shown in FIG. 1, the full-screen window 102 has a display area equal to an area where the touch display unit 101 can accept a touch event and the small window 103 has a display area smaller than the area where the touch display unit 101 can accept a touch event. That is, the display area of the small window is smaller than that of the full-screen window. The small window is obtained by converting the full-screen window based on a first conversion parameter. As shown in FIG. 5, the method includes the following steps.

At step S5110, a first operation is received on the touch display unit for initiating and displaying the first application.

At step S5120, the first application is displayed in the small window on the touch display unit in response to the first operation when the first operation meets a first predetermined condition; and the first application is displayed in the full-screen window on the touch display unit in response to the first operation when the first operation meets a second predetermined condition. The target object associated with the first application can be an application icon of the first application.

In particular, the first operation received in the step S5110 can be a user operation (such as a clicking or dragging operation) that touches the target object.

The first and second predetermined conditions in the step S5120 can be judgment conditions set by the user manually or stored in a default factory setting in a storage medium of the electronic device.

The full-screen window can be converted into the small window based on the first conversion parameter by:

reading graphic buffer data associated with the first application;

converting the read graphic buffer data based on the first conversion parameter;

generating frame buffer data for the touch display unit based on the graphic buffer data; and displaying the small window for the first application on the touch display unit based on the frame buffer data.

Here the graphic buffer data may include coordinate information of each pixel and RGB (Red Green Blue) information of each pixel.

Since small windows associated with respective applications may partly overlap each other, the coordinate information of each pixel in the graphic buffer data for the small window associated with each application can be represented as three dimensional (3D) coordinates $x_o$, $y_o$, $z_o$. Here, different small windows have different third dimension coordinates $z_o$. Thus, when two small windows overlap each other partly or even completely, they can be distinguished based their different third dimension coordinates.

The first conversion parameter may be a matrix, e.g., a unit matrix. The small window for the first application can be obtained by converting the extended 3D coordinates $x_o$, $y_o$, $z_o$) in the graphic buffer data based on the first conversion parameter. The graphic buffer data associated with the small window includes the converted coordinates $x_o$, $y_o$, $z_o$) and the RGB information for the respective pixels.

In this way, the full-screen window can be converted into the small window based on the conversion matrix, so as to provide the user with the small window associated with the application and enable the user to view the content of the application executed in any small window flexibly.

Preferably, various adjustments can be applied to a small window by adjusting the conversion matrix associated with the small window.

For example, in order to scale down a small window by a factor of N, where N is an integer larger than 1, the conversion matrix associated with the small window can be changed into $$\begin{pmatrix} 1/N & 0 & 0 \\ 0 & 1/N & 0 \\ 0 & 0 & 1/N \end{pmatrix}$$

in response. In this case, the 3D coordinates $x_t$, $y_t$, $z_t$) of the individual pixels in the frame buffer data associated with the small window will become:

$$x_t, y_t, z_t) = \begin{pmatrix} 1/N & 0 & 0 \\ 0 & 1/N & 0 \\ 0 & 0 & 1/N \end{pmatrix} \times \begin{pmatrix} x_o \\ y_o \\ z_o \end{pmatrix}.$$

Then, in order to further move the small window by $\Delta x$ laterally and by $\Delta y$ longitudinally, the conversion matrix associated with the small window can be changed into $$\begin{pmatrix} 1/N & 0 & \Delta x \\ 0 & 1/N & \Delta y \\ 0 & 0 & 1/N \end{pmatrix}.$$

In this case, the 3D coordinates $x_t$, $y_t$, $z_t$) of the individual pixels in the frame buffer data associated with the small window will become:

$$x_t, y_t, z_t) = \begin{pmatrix} 1/N & 0 & \Delta x \\ 0 & 1/N & \Delta y \\ 0 & 0 & 1/N \end{pmatrix} \times \begin{pmatrix} x_o \\ y_o \\ z_o \end{pmatrix}.$$

In the information processing method according to this embodiment, with the first application, the first application can be opened and at the same time the first application can be controlled to be displayed in a full-screen window or in a small window. It is possible to avoid the troublesome operation for opening the first application and then adjusting the size of the window when the user wants to display the first application in a small window. In this way, the user experience can be improved.

7th Embodiment

In this embodiment, an information processing method is provided. The method is applied in an electronic device having a touch display unit and capable of executing a first application. The touch display unit is capable of displaying at least one target object associated with the first application and displaying the first application in a small window or a full-screen window in response to the target object being touched. As shown in FIG. 1, the full-screen window 102 has a display area equal to an area where the touch display unit 101 can accept a touch event and the small window 103 has a display area smaller than the area where the touch display unit 101 can accept a touch event. That is, the display area of the small window is smaller than that of the full-screen window. The small window is obtained by converting the full-screen window based on a first conversion parameter. As shown in FIG. 5, the method includes the following steps.

At step S5110, a first operation is received on the touch display unit for initiating and displaying the first application.

At step S5120, the first application is displayed in the small window on the touch display unit in response to the first operation when the first operation meets a first predetermined condition; and the first application is displayed in the full-screen window on the touch display unit in response to the first operation when the first operation meets a second predetermined condition.

Here, the first operation meets the first predetermined condition when the target object is touched by the first operation for a duration longer than a first predetermined value. The first operation meets the second predetermined condition when the target object is touched by the first operation for a duration equal to or shorter than the first predetermined value.

In particular, the first operation meets the first predetermined condition when the first operation is a long press on the target object and the first operation meets the second predetermined condition when the first operation is a quick click on the target object. The determination as to whether the first operation is a long press or a quick click depends on the duration during which the first operation is continuously applied to the target object. The first predetermined value can be a threshold pre-stored in a medium of the electronic device. The first predetermined value can be set depending on the user's operation custom or on statistics based on a large group of users. There are a number of particular implementations and the description thereof will be omitted here. The first predetermined value may range from 0.2 s to 0.6 s and can be 0.5 s in a particular example.

In an implementation, the target object is typically displayed on the touch display unit of the electronic device in a form of application icon and the region associated with the application icon is the region for accepting the first operation.

Here, the first conversion parameter may be one of a single parameter value, a matrix, a parameter group or a parameter set. The parameter may be a single parameter value, e.g., a ratio of the display area of the small window to the display area of the full-screen window. The parameter group may be a two-tuple that includes two parameters, one being a ratio of the small window to the full-screen window in a first direction and the other being a ratio of the small window to the full-screen window in a second direction perpendicular to the first direction.

The full-screen window can be converted into the small window based on the first conversion parameter by:

reading graphic buffer data associated with the first application;

converting the read graphic buffer data based on the first conversion parameter;

generating frame buffer data for the touch display unit based on the graphic buffer data; and displaying the small window for the first application on the touch display unit based on the frame buffer data.

Here the graphic buffer data may include coordinate information of each pixel and RGB (Red Green Blue) information of each pixel.

Since small windows associated with respective applications may partly overlap each other, the coordinate information of each pixel in the graphic buffer data for the small window associated with each application can be represented as three dimensional (3D) coordinates $x_o$, $y_o$, $z_o$). Here, different small windows have different third dimension coordinates $z_o$. Thus, when two small windows overlap each other partly or even completely, they can be distinguished based their different third dimension coordinates.

The first conversion parameter may be a matrix, e.g., a unit matrix. The small window for the first application can be obtained by converting the extended 3D coordinates $x_o$, $y_o$, $z_o$) in the graphic buffer data based on the first conversion parameter. The graphic buffer data associated with the small window includes the converted coordinates $x_o$, $y_o$, $z_o$) and the RGB information for the respective pixels.

In this way, the full-screen window can be converted into the small window based on the conversion matrix, so as to provide the user with the small window associated with the application and enable the user to view the content of the application executed in any small window flexibly.

Preferably, various adjustments can be applied to a small window by adjusting the conversion matrix associated with the small window.

For example, in order to scale down a small window by a factor of N, where N is an integer larger than 1, the conversion matrix associated with the small window can be changed into $$\begin{pmatrix} 1/N & 0 & 0 \\ 0 & 1/N & 0 \\ 0 & 0 & 1/N \end{pmatrix}$$

in response. In this case, the 3D coordinates $x_t$, $y_t$, $z_t$) of the individual pixels in the frame buffer data associated with the small window will become:

$$(x_t, y_t, z_t) = \begin{pmatrix} 1/N & 0 & 0 \\ 0 & 1/N & 0 \\ 0 & 0 & 1/N \end{pmatrix} \times \begin{pmatrix} x_o \\ y_o \\ z_o \end{pmatrix}.$$

Then, in order to further move the small window by $\Delta x$ laterally and by $\Delta y$ longitudinally, the conversion matrix associated with the small window can be changed into $$\begin{pmatrix} 1/N & 0 & \Delta x \\ 0 & 1/N & \Delta y \\ 0 & 0 & 1/N \end{pmatrix}.$$

In this case, the 3D coordinates $x_t$, $y_t$, $z_t$) of the individual pixels in the frame buffer data associated with the small window will become:

$$x_t, y_t, z_t) = \begin{pmatrix} 1/N & 0 & \Delta x \\ 0 & 1/N & \Delta y \\ 0 & 0 & 1/N \end{pmatrix} \times \begin{pmatrix} x_o \\ y_o \\ z_o \end{pmatrix}.$$

In an embodiment, the size of the small window can be configured by changing the first conversion parameter as desired.

There are various settings for the parameter, matrix, parameter group and parameter set and the details thereof will be omitted here.

In the information processing method according to this embodiment, with one operation (i.e., the first application) applied on the target object, the first application can be opened and at the same time the first application can be selected to be displayed in a full-screen window or in a small window. When compared with the situation where the first application is opened and then the size of the window is adjusted with e.g., a scaling operation, the operation can be significantly simplified and the user experience can be improved.

8$^{th}$ Embodiment

In this embodiment, an information processing method is provided. The method is applied in an electronic device having a touch display unit and capable of executing a first application. The touch display unit is capable of displaying at least one target object associated with the first application and displaying the first application in a small window or a full-screen window in response to the target object being touched. As shown in FIG. 1, the full-screen window 102 has a display area equal to an area where the touch display unit 101 can accept a touch event and the small window 103 has a display area smaller than the area where the touch display unit 101 can accept a touch event. That is, the display area of the small window is smaller than that of the full-screen window. The small window is obtained by converting the full-screen window based on a first conversion parameter. As shown in FIG. 5, the method includes the following steps.

At step S5110, a first operation is received on the touch display unit for initiating and displaying the first application.

At step S5120, the first application is displayed in the small window on the touch display unit in response to the first operation when the first operation meets a first predetermined condition; and the first application is displayed in the full-screen window on the touch display unit in response to the first operation when the first operation meets a second predetermined condition.

Here, the first operation meets the first predetermined condition when the target object is touched by the first operation for m times during a predetermined time period, and the first operation meets the second predetermined condition when the target object is touched by the first operation for n times during the predetermined time period, where m and n are different integers.

The values of m and n can be set arbitrarily as desired. For example, when m=2 and n=1, the first operation meets the second predetermined condition when the first operation is a single-click during the predetermined time period and the first operation meets the first predetermined condition when the first operation is a double-click during the predetermined time period. The predetermined time period can be determined based on the user's custom for a single-click or a double-click or can be preconfigured by the manufacturer according to statistics based on most users' operations. In an embodiment, each of m and n may have more than one value. For example, when m is an even number, the first operation meets the first predetermined condition if the target object is touched by the first operation for 2, 4 or 6 times. When n is an odd number, the first operation meets the second predetermined condition if the target object is touched by the first operation for 1, 3 or 5 times.

Here, the first conversion parameter may be one of a single parameter value, a matrix, a parameter group or a parameter set. The parameter may be a single parameter value, e.g., a ratio of the display area of the small window to the display area of the full-screen window. The parameter group may be a two-tuple that includes two parameters, one being a ratio of the small window to the full-screen window in a first direction and the other being a ratio of the small window to the full-screen window in a second direction perpendicular to the first direction.

The full-screen window can be converted into the small window based on the first conversion parameter by:

reading graphic buffer data associated with the first application;

converting the read graphic buffer data based on the first conversion parameter;

generating frame buffer data for the touch display unit based on the graphic buffer data; and displaying the small window for the first application on the touch display unit based on the frame buffer data.

Here the graphic buffer data may include coordinate information of each pixel and RGB (Red Green Blue) information of each pixel.

Since small windows associated with respective applications may partly overlap each other, the coordinate information of each pixel in the graphic buffer data for the small window associated with each application can be represented as three dimensional (3D) coordinates $x_o$, $y_o$, $z_o$). Here, different small windows have different third dimension coordinates $z_o$. Thus, when two small windows overlap each other partly or even completely, they can be distinguished based their different third dimension coordinates.

The first conversion parameter may be a matrix, e.g., a unit matrix. The small window for the first application can be obtained by converting the extended 3D coordinates $x_o$, $y_o$, $z_o$) in the graphic buffer data based on the first conversion parameter. The graphic buffer data associated with the small window includes the converted coordinates $x_o$, $y_o$, $z_o$) and the RGB information for the respective pixels.

In this way, the full-screen window can be converted into the small window based on the conversion matrix, so as to provide the user with the small window associated with the application and enable the user to view the content of the application executed in any small window flexibly.

Preferably, various adjustments can be applied to a small window by adjusting the conversion matrix associated with the small window.

For example, in order to scale down a small window by a factor of N, where N is an integer larger than 1, the conversion matrix associated with the small window can be changed into $$\begin{pmatrix} 1/N & 0 & 0 \\ 0 & 1/N & 0 \\ 0 & 0 & 1/N \end{pmatrix}$$

in response. In this case, the 3D coordinates $x_t$, $y_t$, $z_t$) of the individual pixels in the frame buffer data associated with the small window will become:

$$(x_t, y_t, z_t) = \begin{pmatrix} 1/N & 0 & 0 \\ 0 & 1/N & 0 \\ 0 & 0 & 1/N \end{pmatrix} \times \begin{pmatrix} x_o \\ y_o \\ z_o \end{pmatrix}.$$

Then, in order to further move the small window by $\Delta x$ laterally and by $\Delta y$ longitudinally, the conversion matrix associated with the small window can be changed into $$\begin{pmatrix} 1/N & 0 & \Delta x \\ 0 & 1/N & \Delta y \\ 0 & 0 & 1/N \end{pmatrix}.$$

In this case, the 3D coordinates $x_t$, $y_t$, $z_t$) of the individual pixels in the frame buffer data associated with the small window will become:

$$(x_t, y_t, z_t) = \begin{pmatrix} 1/N & 0 & \Delta x \\ 0 & 1/N & \Delta y \\ 0 & 0 & 1/N \end{pmatrix} \times \begin{pmatrix} x_o \\ y_o \\ z_o \end{pmatrix}.$$

In an embodiment, the size of the small window can be configured by changing the first conversion parameter as desired.

There are various settings for the parameter, matrix, parameter group and parameter set and the details thereof will be omitted here.

In the information processing method according to this embodiment, it is determined whether to open the first application in a full-screen window or in a small window based on the number of times the target object is touched by the first operation. Compared with the prior art, the size of the window for opening the first application can be determined when the first application is opened. In this way, the user experience can be significantly improved.

9$^{th}$ Embodiment

In this embodiment, an information processing method is provided. The method is applied in an electronic device having a touch display unit and capable of executing a first application. The touch display unit is capable of displaying at least one target object associated with the first application and displaying the first application in a small window or a full-screen window in response to the target object being touched. As shown in FIG. 1, the full-screen window 102 has a display area equal to an area where the touch display unit 101 can accept a touch event and the small window 103 has a display area smaller than the area where the touch display unit 101 can accept a touch event. That is, the display area of the small window is smaller than that of the full-screen window. The small window is obtained by converting the full-screen window based on a first conversion parameter. As shown in FIG. 5, the method includes the following steps.

At step S5110, a first operation is received on the touch display unit for initiating and displaying the first application.

At step S5120, the first application is displayed in the small window on the touch display unit in response to the first operation when the first operation meets a first predetermined condition; and the first application is displayed in the full-screen window on the touch display unit in response to the first operation when the first operation meets a second predetermined condition.

Here, the target object includes a first region and a second region. The first operation meets the first predetermined condition when the first operation touches a region included in the first region, and the first operation meets the second predetermined condition when the first operation touches a region included in the second region.

In an implementation, the first region and the second region do not overlap each other. In particular, as shown in FIG. 6, the target object 104 includes a first region 1041 and a second region 1042 that does not overlap the first region 1041.

The first operation meets the first predetermined condition when the first operation touches a region included in the first region 1041, and the first operation meets the second predetermined condition when the first operation touches a region included in the second region 1042.

Figure 6:
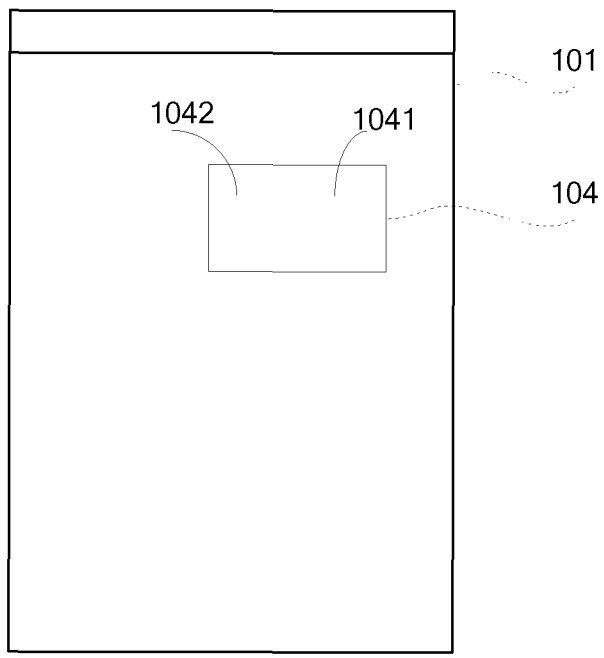
FIG. 6 is a schematic diagram showing a second display effect according to an embodiment of the present invention.

The target object 104 shown in FIG. 6 is divided into the first region 1041 and the second region 1042 along the dotted line in the figure, the region on the left side of the dotted line being the second region 1042 and the region on the right side of the dotted line being the first region 1041. In an implementation, the first region 1041 and the second region 1042 can be arranged vertically. The specific division can be set by the user or the manufacturer.

Further, the first region and the second region may overlap each other. For the target object 104 shown in FIG. 6 as an example, the first region can be the left region 1041 of the target object and the second region can include the entire target object, e.g., including both regions 1041 and 1042. In this case, when the first operation touches a region included in the first region 1041, it is determined that the first operation meets the first predetermined condition. When the first operation touches a region that is at least partly outside the first region 1041, it is determined that the touched region is included in the entire region of the target object and thus the first operation meets the second predetermined condition.

Here, the first conversion parameter may be one of a single parameter value, a matrix, a parameter group or a parameter set. The parameter may be a single parameter value, e.g., a ratio of the display area of the small window to the display area of the full-screen window. The parameter group may be a two-tuple that includes two parameters, one being a ratio of the small window to the full-screen window in a first direction and the other being a ratio of the small window to the full-screen window in a second direction perpendicular to the first direction.

The full-screen window can be converted into the small window based on the first conversion parameter by:

reading graphic buffer data associated with the first application;

converting the read graphic buffer data based on the first conversion parameter;

generating frame buffer data for the touch display unit based on the graphic buffer data; and displaying the small window for the first application on the touch display unit based on the frame buffer data.

Here the graphic buffer data may include coordinate information of each pixel and RGB (Red Green Blue) information of each pixel.

Since small windows associated with respective applications may partly overlap each other, the coordinate information of each pixel in the graphic buffer data for the small window associated with each application can be represented as three dimensional (3D) coordinates $x_o$, $y_o$, $z_o$. Here, different small windows have different third dimension coordinates $z_o$. Thus, when two small windows overlap each other partly or even completely, they can be distinguished based their different third dimension coordinates.

The first conversion parameter may be a matrix, e.g., a unit matrix. The small window for the first application can be obtained by converting the extended 3D coordinates $x_o$, $y_o$, $z_o$) in the graphic buffer data based on the first conversion parameter. The graphic buffer data associated with the small window includes the converted coordinates $x_o$, $y_o$, $z_o$) and the RGB information for the respective pixels.

In this way, the full-screen window can be converted into the small window based on the conversion matrix, so as to provide the user with the small window associated with the application and enable the user to view the content of the application executed in any small window flexibly.

Preferably, various adjustments can be applied to a small window by adjusting the conversion matrix associated with the small window.

For example, in order to scale down a small window by a factor of N, where N is an integer larger than 1, the conversion matrix associated with the small window can be changed into $$\begin{pmatrix} 1/N & 0 & 0 \\ 0 & 1/N & 0 \\ 0 & 0 & 1/N \end{pmatrix}$$

in response. In this case, the 3D coordinates $x_t$, $y_t$, $z_t$) of the individual pixels in the frame buffer data associated with the small window will become:

$$x_t, y_t, z_t) = \begin{pmatrix} 1/N & 0 & 0 \\ 0 & 1/N & 0 \\ 0 & 0 & 1/N \end{pmatrix} \times \begin{pmatrix} x_o \\ y_o \\ z_o \end{pmatrix}.$$

Then, in order to further move the small window by $\Delta x$ laterally and by $\Delta y$ longitudinally, the conversion matrix associated with the small window can be changed into $$\begin{pmatrix} 1/N & 0 & \Delta x \\ 0 & 1/N & \Delta y \\ 0 & 0 & 1/N \end{pmatrix}.$$

In this case, the 3D coordinates $x_t$, $y_t$, $z_t$) of the individual pixels in the frame buffer data associated with the small window will become:

$$x_t, y_t, z_t) = \begin{pmatrix} 1/N & 0 & \Delta x \\ 0 & 1/N & \Delta y \\ 0 & 0 & 1/N \end{pmatrix} \times \begin{pmatrix} x_o \\ y_o \\ z_o \end{pmatrix}.$$

In an embodiment, the size of the small window can be configured by changing the first conversion parameter as desired.

There are various settings for the parameter, matrix, parameter group and parameter set and the details thereof will be omitted here.

With the information processing method according to this embodiment, the target object for accepting the first operation for opening the first application is divided into two regions. The first application can be opened in a full-screen window or in a small window, depending on which of the regions is touched by the first operation. Again, with one operation, the first application can be opened and at the same time the first application can be selected to be opened in a full-screen window or in a small window. In this way, the operation can be simplified and the user experience can be improved.

10$^{th}$ Embodiment

In this embodiment, an information processing method is provided. The method is applied in an electronic device having a touch display unit and capable of executing a first application. The touch display unit is capable of displaying at least one target object associated with the first application and displaying the first application in a small window or a full-screen window in response to the target object being touched. As shown in FIG. 1, the full-screen window 102 has a display area equal to an area where the touch display unit 101 can accept a touch event and the small window 103 has a display area smaller than the area where the touch display unit 101 can accept a touch event. That is, the display area of the small window is smaller than that of the full-screen window. The small window is obtained by converting the full-screen window based on a first conversion parameter. As shown in FIG. 5, the method includes the following steps.

At step S5110, a first operation is received on the touch display unit for initiating and displaying the first application.

At step S5120, the first application is displayed in the small window on the touch display unit in response to the first operation when the first operation meets a first predetermined condition; and the first application is displayed in the full-screen window on the touch display unit in response to the first operation when the first operation meets a second predetermined condition.

Figure 7:
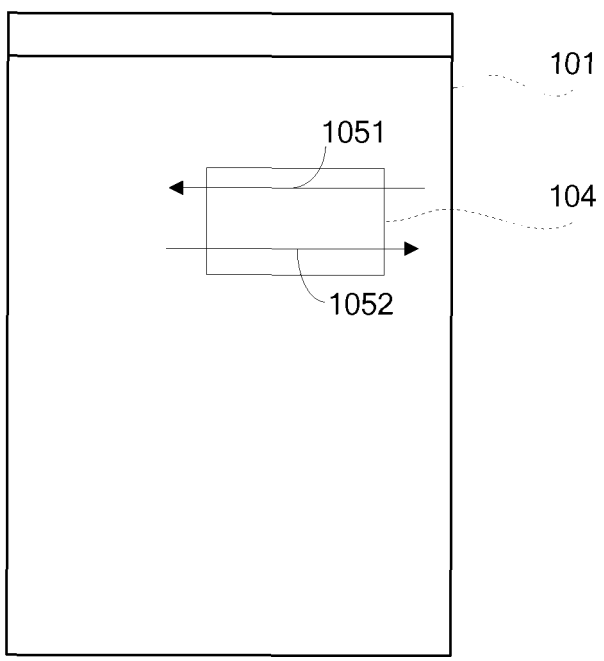
FIG. 7 is a schematic diagram showing a third display effect according to an embodiment of the present invention.

Here, as shown in FIG. 7, the first operation is a sliding touch operation on the target object. The first operation meets the first predetermined condition when the first operation slides in a first direction 1051, and the first operation meets the second predetermined condition when the first operation slides in a second direction 1052 different from the first direction 1051.

As shown in FIG. 7, the arrow indicates the direction in which the first operation slides. The first direction 1051 and the second direction 1052 can be completely opposite directions. Alternatively, the sliding start point of the first operation can be considered as an origin of a Cartesian coordinates system. When the sliding path of the first operation on the target object falls within a range from 0° (inclusive) to 180°, it is determined that the sliding direction of the first operation is the first direction and thus the first predetermined condition is met. When the sliding path of the first operation on the target object falls within a range from 180° (inclusive) to 360°, it is determined that the sliding direction of the first operation is the second direction and thus the second predetermined condition is met. In an embodiment, the sliding direction can be determined based on a line connecting the start point and the end point of the sliding path.

There may be a number of implementations as longs as the first direction differs from the second direction, and the description thereof will be omitted here.

Here, the first conversion parameter may be one of a single parameter value, a matrix, a parameter group or a parameter set. The parameter may be a single parameter value, e.g., a ratio of the display area of the small window to the display area of the full-screen window. The parameter group may be a two-tuple that includes two parameters, one being a ratio of the small window to the full-screen window in a first direction and the other being a ratio of the small window to the full-screen window in a second direction perpendicular to the first direction.

The full-screen window can be converted into the small window based on the first conversion parameter by:

reading graphic buffer data associated with the first application;

converting the read graphic buffer data based on the first conversion parameter;

generating frame buffer data for the touch display unit based on the graphic buffer data; and displaying the small window for the first application on the touch display unit based on the frame buffer data.

Here the graphic buffer data may include coordinate information of each pixel and RGB (Red Green Blue) information of each pixel.

Since small windows associated with respective applications may partly overlap each other, the coordinate information of each pixel in the graphic buffer data for the small window associated with each application can be represented as three dimensional (3D) coordinates $x_o$, $y_o$, $z_o$). Here, different small windows have different third dimension coordinates $z_o$. Thus, when two small windows overlap each other partly or even completely, they can be distinguished based their different third dimension coordinates.

The first conversion parameter may be a matrix, e.g., a unit matrix. The small window for the first application can be obtained by converting the extended 3D coordinates $x_o$, $y_o$, $z_o$) in the graphic buffer data based on the first conversion parameter. The graphic buffer data associated with the small window includes the converted coordinates $x_o$, $y_o$, $z_o$) and the RGB information for the respective pixels.

In this way, the full-screen window can be converted into the small window based on the conversion matrix, so as to provide the user with the small window associated with the application and enable the user to view the content of the application executed in any small window flexibly.

Preferably, various adjustments can be applied to a small window by adjusting the conversion matrix associated with the small window.

For example, in order to scale down a small window by a factor of N, where N is an integer larger than 1, the conversion matrix associated with the small window can be changed into $$\begin{pmatrix} 1/N & 0 & 0 \\ 0 & 1/N & 0 \\ 0 & 0 & 1/N \end{pmatrix}$$

in response. In this case, the 3D coordinates $x_t$, $y_t$, $z_t$) of the individual pixels in the frame buffer data associated with the small window will become:

$$x_t, y_t, z_t) = \begin{pmatrix} 1/N & 0 & 0 \\ 0 & 1/N & 0 \\ 0 & 0 & 1/N \end{pmatrix} \times \begin{pmatrix} x_o \\ y_o \\ z_o \end{pmatrix}.$$

Then, in order to further move the small window by $\Delta x$ laterally and by $\Delta y$ longitudinally, the conversion matrix associated with the small window can be changed into $$\begin{pmatrix} 1/N & 0 & \Delta x \\ 0 & 1/N & \Delta y \\ 0 & 0 & 1/N \end{pmatrix}.$$

In this case, the 3D coordinates $x_t$, $y_t$, $z_t$) of the individual pixels in the frame buffer data associated with the small window will become:

$$x_t, y_t, z_t) = \begin{pmatrix} 1/N & 0 & \Delta x \\ 0 & 1/N & \Delta y \\ 0 & 0 & 1/N \end{pmatrix} \times \begin{pmatrix} x_o \\ y_o \\ z_o \end{pmatrix}.$$

In an embodiment, the size of the small window can be configured by changing the first conversion parameter as desired.

There are various settings for the parameter, matrix, parameter group and parameter set and the details thereof will be omitted here.

With the information processing method according to this embodiment, it is determined whether to open the first application in a full-screen window or in a small window based on the sliding direction of the first operation. Again, with one operation, the first application can be opened and at the same time the first application can be selected to be opened in a full-screen window or in a small window. In this way, the operation can be simplified and the user experience can be improved.

11$^{th}$ Embodiment

In this embodiment, an information processing method is provided. The method is applied in an electronic device having a touch display unit and capable of executing a first application. The touch display unit is capable of displaying at least one target object associated with the first application and displaying the first application in a small window or a full-screen window in response to the target object being touched. As shown in FIG. 1, the full-screen window 102 has a display area equal to an area where the touch display unit 101 can accept a touch event and the small window 103 has a display area smaller than the area where the touch display unit 101 can accept a touch event. That is, the display area of the small window is smaller than that of the full-screen window. The small window is obtained by converting the full-screen window based on a first conversion parameter. As shown in FIG. 5, the method includes the following steps.

At step S5110, a first operation is received on the touch display unit for initiating and displaying the first application.

At step S5120, the first application is displayed in the small window on the touch display unit in response to the first operation when the first operation meets a first predetermined condition; and the first application is displayed in the full-screen window on the touch display unit in response to the first operation when the first operation meets a second predetermined condition.

Here, the electronic device further includes a pressure sensor. The first operation is a pressing touch operation on the target object. The first operation meets the first predetermined condition when the first operation has a pressure higher than a second predetermined value, and the first operation meets the second predetermined condition when the first operation has a pressure equal to or lower than the second predetermined value.

The second predetermined value can be determined as an average or a function of pressures of multiple operations accepted from the user, so as to comply with the users personal requirements. Alternatively, the second predetermined value can be configured as a default value by the manufacturer according to statistics or simulation data based on the structure and/or material of the device. The statistics or simulation data can be samples of pressing operations performed by users selected from a large number of users on the electronic device.

Here, the first conversion parameter may be one of a single parameter value, a matrix, a parameter group or a parameter set. The parameter may be a single parameter value, e.g., a ratio of the display area of the small window to the display area of the full-screen window. The parameter group may be a two-tuple that includes two parameters, one being a ratio of the small window to the full-screen window in a first direction and the other being a ratio of the small window to the full-screen window in a second direction perpendicular to the first direction.

The full-screen window can be converted into the small window based on the first conversion parameter by:

reading graphic buffer data associated with the first application;

converting the read graphic buffer data based on the first conversion parameter;

generating frame buffer data for the touch display unit based on the graphic buffer data; and displaying the small window for the first application on the touch display unit based on the frame buffer data.

Here the graphic buffer data may include coordinate information of each pixel and RGB (Red Green Blue) information of each pixel.

Since small windows associated with respective applications may partly overlap each other, the coordinate information of each pixel in the graphic buffer data for the small window associated with each application can be represented as three dimensional (3D) coordinates $x_o$, $y_o$, $z_o$). Here, different small windows have different third dimension coordinates $z_o$. Thus, when two small windows overlap each other partly or even completely, they can be distinguished based their different third dimension coordinates.

The first conversion parameter may be a matrix, e.g., a unit matrix. The small window for the first application can be obtained by converting the extended 3D coordinates $x_o$, $y_o$, $z_o$) in the graphic buffer data based on the first conversion parameter. The graphic buffer data associated with the small window includes the converted coordinates $x_o$, $y_o$, $z_o$) and the RGB information for the respective pixels.

In this way, the full-screen window can be converted into the small window based on the conversion matrix, so as to provide the user with the small window associated with the application and enable the user to view the content of the application executed in any small window flexibly.

Preferably, various adjustments can be applied to a small window by adjusting the conversion matrix associated with the small window.

For example, in order to scale down a small window by a factor of N, where N is an integer larger than 1, the conversion matrix associated with the small window can be changed into $$\begin{pmatrix} 1/N & 0 & 0 \\ 0 & 1/N & 0 \\ 0 & 0 & 1/N \end{pmatrix}$$

in response. In this case, the 3D coordinates $x_t$, $y_t$, $z_t$) of the individual pixels in the frame buffer data associated with the small window will become:

$$x_t, y_t, z_t) = \begin{pmatrix} 1/N & 0 & 0 \\ 0 & 1/N & 0 \\ 0 & 0 & 1/N \end{pmatrix} \times \begin{pmatrix} x_o \\ y_o \\ z_o \end{pmatrix}.$$

Then, in order to further move the small window by $\Delta x$ laterally and by $\Delta y$ longitudinally, the conversion matrix associated with the small window can be changed into $$\begin{pmatrix} 1/N & 0 & \Delta x \\ 0 & 1/N & \Delta y \\ 0 & 0 & 1/N \end{pmatrix}.$$

In this case, the 3D coordinates $x_t$, $y_t$, $z_t$) of the individual pixels in the frame buffer data associated with the small window will become:

$$x_t, y_t, z_t) = \begin{pmatrix} 1/N & 0 & \Delta x \\ 0 & 1/N & \Delta y \\ 0 & 0 & 1/N \end{pmatrix} \times \begin{pmatrix} x_o \\ y_o \\ z_o \end{pmatrix}.$$

In an embodiment, the size of the small window can be configured by changing the first conversion parameter as desired.

There are various settings for the parameter, matrix, parameter group and parameter set and the details thereof will be omitted here.

With the information processing method according to this embodiment, it is determined whether to open the first application in a full-screen window or in a small window based on the pressure of the first operation on the target object. Again, with one operation, the first application can be opened and at the same time the first application can be selected to be opened in a full-screen window or in a small window. In this way, the operation can be simplified and the user experience can be improved.

As discussed above, with the information processing methods according to the 6$^{th}$ to 11$^{th}$ embodiments, the user can not only open the first application, but also open it in a full-screen window or a small window by performing a single first operation. In this way, the users requirement for opening the first application in a window of his/her desired size with a single operation can be met. The user experience can thus be improved.

12$^{th}$ Embodiment

Figure 8:
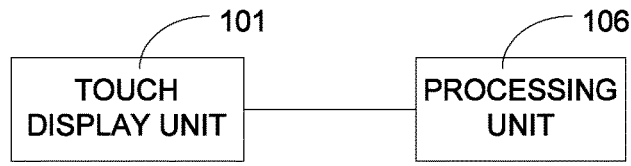
FIG. 8 is a schematic diagram showing a first structure of an electronic device according to an embodiment of the present invention.

According to this embodiment, an electronic device is provided, as shown in FIG. 8. The electronic device is capable of executing a first application. The electronic device includes a touch display unit 101 and a processing unit 106.

The touch display unit 101 is configured to display at least one target object associated with the first application and initiate and display the first application in a small window or a full-screen window in response to the target object being touched. The full-screen window has a display area equal to an area where the touch display unit can accept a touch event and the small window has a display area smaller than the area where the touch display unit can accept a touch event. The small window is obtained by converting the full-screen window based on a first conversion parameter.

The touch display unit 101 is further configured to receive a first operation for initiating the first application.

The processing unit 106 is configured to, in response to the first operation, generate and transmit a first trigger instruction to the touch display unit when the first application meets a first predetermined condition and generate and transmit a second trigger instruction to the touch display unit when the first application meets a second predetermined condition.

The touch display unit 101 is further configured to display the first application in the small window in response to receiving the first trigger instruction and display the first application in the full-screen window in response to receiving the second trigger instruction.

The hardware structure of the touch display unit 101 may include a touch screen which may have a structure of a liquid crystal touch screen or a Organic Light Emitting Diode (OLED). The touch screen displays the first application under the control of electronic elements such as a printed circuit or any other integrated circuit.

The hardware structure of the processing unit 106 may include a processor, which can be a multi-core or a single-core central processor, digital signal processor, single chip microcomputer or programmable logic array, for determining whether the first application meets the first predetermined condition or the second predetermined condition and generating the first or second trigger instruction based on the determination result to control the touch display unit 101 to open the first application in the full-screen window or in the small window.

Here, the first conversion parameter may be one of a single parameter value, a matrix, a parameter group or a parameter set. The parameter may be a single parameter value, e.g., a ratio of the display area of the small window to the display area of the full-screen window. The parameter group may be a two-tuple that includes two parameters, one being a ratio of the small window to the full-screen window in a first direction and the other being a ratio of the small window to the full-screen window in a second direction perpendicular to the first direction.

The full-screen window can be converted into the small window based on the first conversion parameter by:

reading graphic buffer data associated with the first application;

converting the read graphic buffer data based on the first conversion parameter;

generating frame buffer data for the touch display unit based on the graphic buffer data; and displaying the small window for the first application on the touch display unit based on the frame buffer data.

Here the graphic buffer data may include coordinate information of each pixel and RGB (Red Green Blue) information of each pixel.

Since small windows associated with respective applications may partly overlap each other, the coordinate information of each pixel in the graphic buffer data for the small window associated with each application can be represented as three dimensional (3D) coordinates $x_o$, $y_o$, $z_o$). Here, different small windows have different third dimension coordinates $z_o$. Thus, when two small windows overlap each other partly or even completely, they can be distinguished based their different third dimension coordinates.

The first conversion parameter may be a matrix, e.g., a unit matrix. The small window for the first application can be obtained by converting the extended 3D coordinates $x_o$, $y_o$, $z_o$) in the graphic buffer data based on the first conversion parameter. The graphic buffer data associated with the small window includes the converted coordinates $x_o$, $y_o$, $z_o$) and the RGB information for the respective pixels.

In this way, the full-screen window can be converted into the small window based on the conversion matrix, so as to provide the user with the small window associated with the application and enable the user to view the content of the application executed in any small window flexibly.

Preferably, various adjustments can be applied to a small window by adjusting the conversion matrix associated with the small window.

For example, in order to scale down a small window by a factor of N, where N is an integer larger than 1, the conversion matrix associated with the small window can be changed into $$\begin{pmatrix} 1/N & 0 & 0 \\ 0 & 1/N & 0 \\ 0 & 0 & 1/N \end{pmatrix}$$

in response. In this case, the 3D coordinates $x_t$, $y_t$, $z_t$) of the individual pixels in the frame buffer data associated with the small window will become:

$$x_t, y_t, z_t) = \begin{pmatrix} 1/N & 0 & 0 \\ 0 & 1/N & 0 \\ 0 & 0 & 1/N \end{pmatrix} \times \begin{pmatrix} x_o \\ y_o \\ z_o \end{pmatrix}.$$

Then, in order to further move the small window by $\Delta x$ laterally and by $\Delta y$ longitudinally, the conversion matrix associated with the small window can be changed into $$\begin{pmatrix} 1/N & 0 & \Delta x \\ 0 & 1/N & \Delta y \\ 0 & 0 & 1/N \end{pmatrix}.$$

In this case, the 3D coordinates $(x_t, y_t, z_t)$ of the individual pixels in the frame buffer data associated with the small window will become:

$$(x_t, y_t, z_t) = \begin{pmatrix} 1/N & 0 & \Delta x \\ 0 & 1/N & \Delta y \\ 0 & 0 & 1/N \end{pmatrix} \times \begin{pmatrix} x_o \\ y_o \\ z_o \end{pmatrix}.$$

In an embodiment, the size of the small window can be configured by changing the first conversion parameter as desired.

There are various settings for the parameter, matrix, parameter group and parameter set and the details thereof will be omitted here.

In an implementation, the electronic device further includes a processor for converting the full-screen window into the small window based on the first conversion parameter. The electronic device may include one or more processors and multiple functional units for implementing various functions can be integrated into a single processor. These functional units include the touch display unit 101 and the processing unit 106.

With the electronic device according to this embodiment, a hardware solution is provided for implementing the information processing method according to the 1st embodiment. Unlike the conventional device, it is possible to select to display an application in a full-screen or in a small window based on the application itself, thereby improving the user experience.

13$^{th}$ Embodiment

Figure 9:
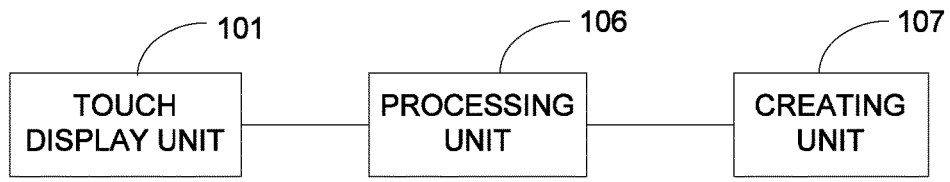
FIG. 9 is a schematic diagram showing a second structure of an electronic device according to an embodiment of the present invention.

According to this embodiment, an electronic device is provided, as shown in FIG. 9. The electronic device can be a smart terminal such as a smart phone or a tablet computer. The electronic device is capable of executing a first application. The electronic device includes a touch display unit 101 and a processing unit 106.

The touch display unit 101 is configured to display at least one target object associated with the first application and initiate and display the first application in a small window or a full-screen window in response to the target object being touched. The full-screen window has a display area equal to an area where the touch display unit can accept a touch event and the small window has a display area smaller than the area where the touch display unit can accept a touch event. The small window is obtained by converting the full-screen window based on a first conversion parameter.

The touch display unit 101 is further configured to receive a first operation for initiating the first application.

The processing unit 106 is configured to, in response to the first operation, generate and transmit a first trigger instruction to the touch display unit when the first application meets a first predetermined condition and generate and transmit a second trigger instruction to the touch display unit when the first application meets a second predetermined condition.

The touch display unit 101 is further configured to display the first application in the small window in response to receiving the first trigger instruction and display the first application in the full-screen window in response to receiving the second trigger instruction.

The hardware structure of the touch display unit 101 may include a touch screen which may have a structure of a liquid crystal touch screen or a Organic Light Emitting Diode (OLED). The touch screen displays the first application under the control of electronic elements such as a printed circuit or any other integrated circuit.

The hardware structure of the processing unit 106 may include a processor, which can be a multi-core or a single-core central processor, digital signal processor, single chip microcomputer or programmable logic array, for determining whether the first application meets the first predetermined condition or the second predetermined condition and generating the first or second trigger instruction based on the determination result to control the touch display unit 101 to open the first application in the full-screen window or in the small window.

The device further includes a creating unit 107 configured to create a first predetermined list including one or more applications to be displayed in the small window, or a second predetermined list including one or more applications to be displayed in the full-screen window.

The processing unit 106 includes a determining module and an instruction generation and transmission module. The determining module is configured to: determine that the first application meets the first predetermined condition when the first application is included in the first predetermined list, and the first application meets the second predetermined condition when the first application is not included in the first predetermined list; or determine that the first application meets the first predetermined condition when the first application is not included in the second predetermined list, and the first application meets the second predetermined condition when the first application is included in the second predetermined list.

The instruction generation and transmission module is configured to transmit the first trigger instruction when the first application meets the first predetermined condition, and to transmit the second trigger instruction when the first application meets the second predetermined condition.

The physical structure of the creating unit 107 depends on the schemes for creating the first or second predetermined list. When the first or second predetermined list is created based on user input, the creating unit 107 includes a human-machine interaction interface for accepting the user input. The creating unit further includes: a processor for receiving the user input and generating the first or second predetermined list based on the user input; and a storage medium for storing the first or second predetermined list generated by the processor.

The determining module of the processing unit 106 can search the first or second predetermined list for an application identification number or application name of the first application, so as to determine whether the first application is included in the first or second predetermined list. The physical structure of the determining module may also include a processor or an integrated circuit or electronic element for implementing the comparing and determining functions.

The instruction generation and transmission module of the processing unit 106 is connected with the determining module for receiving the determination result of the determining module, generating the first or second trigger instruction based on the determining result and transmitting it to the touch display unit 101. Here, the physical structure of the instruction generation and transmission module may also include a processor and a structure such as a communication interface or a connection bus. Here the processor is configured to generate the first or second trigger instruction based on the determination result. The communication interface or the connection bus is connected with the determining module and the touch display unit 101 and configured to receive the determination result and transmit the first or second trigger instruction. In an implementation, the determining module and the instruction generation and transmission module may be functional modules having different processing functions and integrated into a single processor.

Here, the first conversion parameter may be one of a single parameter value, a matrix, a parameter group or a parameter set. The parameter may be a single parameter value, e.g., a ratio of the display area of the small window to the display area of the full-screen window. The parameter group may be a two-tuple that includes two parameters, one being a ratio of the small window to the full-screen window in a first direction and the other being a ratio of the small window to the full-screen window in a second direction perpendicular to the first direction.

The full-screen window can be converted into the small window based on the first conversion parameter by:

reading graphic buffer data associated with the first application;

converting the read graphic buffer data based on the first conversion parameter;

generating frame buffer data for the touch display unit based on the graphic buffer data; and displaying the small window for the first application on the touch display unit based on the frame buffer data.

Here the graphic buffer data may include coordinate information of each pixel and RGB (Red Green Blue) information of each pixel.

Since small windows associated with respective applications may partly overlap each other, the coordinate information of each pixel in the graphic buffer data for the small window associated with each application can be represented as three dimensional (3D) coordinates $x_o$, $y_o$, $z_o$). Here, different small windows have different third dimension coordinates $z_o$. Thus, when two small windows overlap each other partly or even completely, they can be distinguished based their different third dimension coordinates.

The first conversion parameter may be a matrix, e.g., a unit matrix. The small window for the first application can be obtained by converting the extended 3D coordinates $x_o$, $y_o$, $z_o$) in the graphic buffer data based on the first conversion parameter. The graphic buffer data associated with the small window includes the converted coordinates $x_o$, $y_o$, $z_o$) and the RGB information for the respective pixels.

In this way, the full-screen window can be converted into the small window based on the conversion matrix, so as to provide the user with the small window associated with the application and enable the user to view the content of the application executed in any small window flexibly.

Preferably, various adjustments can be applied to a small window by adjusting the conversion matrix associated with the small window.

For example, in order to scale down a small window by a factor of N, where N is an integer larger than 1, the conversion matrix associated with the small window can be changed into $$\begin{pmatrix} 1/N & 0 & 0 \\ 0 & 1/N & 0 \\ 0 & 0 & 1/N \end{pmatrix}$$

in response. In this case, the 3D coordinates $x_t$, $y_t$, $z_t$) of the individual pixels in the frame buffer data associated with the small window will become:

$$(x_t, y_t, z_t) = \begin{pmatrix} 1/N & 0 & 0 \\ 0 & 1/N & 0 \\ 0 & 0 & 1/N \end{pmatrix} \times \begin{pmatrix} x_o \\ y_o \\ z_o \end{pmatrix}.$$

Then, in order to further move the small window by $\Delta x$ laterally and by $\Delta y$ longitudinally, the conversion matrix associated with the small window can be changed into $$\begin{pmatrix} 1/N & 0 & \Delta x \\ 0 & 1/N & \Delta y \\ 0 & 0 & 1/N \end{pmatrix}.$$

In this case, the 3D coordinates $x_t$, $y_t$, $z_t$) of the individual pixels in the frame buffer data associated with the small window will become:

$$(x_t, y_t, z_t) = \begin{pmatrix} 1/N & 0 & \Delta x \\ 0 & 1/N & \Delta y \\ 0 & 0 & 1/N \end{pmatrix} \times \begin{pmatrix} x_o \\ y_o \\ z_o \end{pmatrix}.$$

In an embodiment, the size of the small window can be configured by changing the first conversion parameter as desired.

There are various settings for the parameter, matrix, parameter group and parameter set and the details thereof will be omitted here.

In an implementation, the electronic device further includes a processor for converting the full-screen window into the small window based on the first conversion parameter. The electronic device may include one or more processors and multiple functional units for implementing various functions can be integrated into a single processor. These functional units include the touch display unit 101 and the processing unit 106.

Compared with the electronic device according to the 12$^{th}$ embodiment, a creating unit is added to provide details of the processing unit. A specific structure for determining whether the first application meets the first or second predetermined condition is provided. A hardware solution is provided for implementing the information processing method according to the 2$^{nd}$ embodiment. The user experience can be improved. This embodiment is advantageous in that it is simple in structure and it is easy to implement.

14$^{th}$ Embodiment

According to this embodiment, an electronic device is provided, as shown in FIG. 9. The electronic device is capable of executing a first application. The electronic device includes a touch display unit 101 and a processing unit 106.

The touch display unit 101 is configured to display at least one target object associated with the first application and initiate and display the first application in a small window or a full-screen window in response to the target object being touched. The full-screen window has a display area equal to an area where the touch display unit can accept a touch event and the small window has a display area smaller than the area where the touch display unit can accept a touch event. The small window is obtained by converting the full-screen window based on a first conversion parameter.

The touch display unit 101 is further configured to receive a first operation for initiating the first application.

The processing unit 106 is configured to, in response to the first operation, generate and transmit a first trigger instruction to the touch display unit when the first application meets a first predetermined condition and generate and transmit a second trigger instruction to the touch display unit when the first application meets a second predetermined condition.

The touch display unit 101 is further configured to display the first application in the small window in response to receiving the first trigger instruction and display the first application in the full-screen window in response to receiving the second trigger instruction.

The hardware structure of the touch display unit 101 may include a touch screen which may have a structure of a liquid crystal touch screen or a Organic Light Emitting Diode (OLED). The touch screen displays the first application under the control of electronic elements such as a printed circuit or any other integrated circuit.

The hardware structure of the processing unit 106 may include a processor, which can be a multi-core or a single-core central processor, digital signal processor, single chip microcomputer or programmable logic array, for determining whether the first application meets the first predetermined condition or the second predetermined condition and generating the first or second trigger instruction based on the determination result to control the touch display unit 101 to open the first application in the full-screen window or in the small window.

The device further includes a creating unit 107 configured to create a first predetermined list including one or more applications to be displayed in the small window, or a second predetermined list including one or more applications to be displayed in the full-screen window.

The processing unit 106 includes a determining module and an instruction generation and transmission module. The determining module is configured to: determine that the first application meets the first predetermined condition when the first application is included in the first predetermined list, and the first application meets the second predetermined condition when the first application is not included in the first predetermined list; or determine that the first application meets the first predetermined condition when the first application is not included in the second predetermined list, and the first application meets the second predetermined condition when the first application is included in the second predetermined list.

The instruction generation and transmission module is configured to transmit the first trigger instruction when the first application meets the first predetermined condition, and to transmit the second trigger instruction when the first application meets the second predetermined condition.

The physical structure of the creating unit 107 depends on the schemes for creating the first or second predetermined list. When the first or second predetermined list is created based on user input, the creating unit 107 includes a human-machine interaction interface for accepting the user input. The creating unit further includes: a processor for receiving the user input and generating the first or second predetermined list based on the user input; and a storage medium for storing the first or second predetermined list generated by the processor. In this embodiment, the touch display unit 101 can provide the human-machine interaction interface.

The determining module of the processing unit 106 can search the first or second predetermined list for an application identification number or application name of the first application, so as to determine whether the first application is included in the first or second predetermined list. The physical structure of the determining module may also include a processor or an integrated circuit or electronic element for implementing the comparing and determining functions.

The instruction generation and transmission module of the processing unit 106 is connected with the determining module for receiving the determination result of the determining module, generating the first or second trigger instruction based on the determining result and transmitting it to the touch display unit 101. Here, the physical structure of the instruction generation and transmission module may also include a processor and a structure such as a communication interface or a connection bus. Here the processor is configured to generate the first or second trigger instruction based on the determination result. The communication interface or the connection bus is connected with the determining module and the touch display unit 101 and configured to receive the determination result and transmit the first or second trigger instruction. In an implementation, the determining module and the instruction generation and transmission module may be functional modules having different processing functions and integrated into a single processor.

Here, the first conversion parameter may be one of a single parameter value, a matrix, a parameter group or a parameter set. The parameter may be a single parameter value, e.g., a ratio of the display area of the small window to the display area of the full-screen window. The parameter group may be a two-tuple that includes two parameters, one being a ratio of the small window to the full-screen window in a first direction and the other being a ratio of the small window to the full-screen window in a second direction perpendicular to the first direction.

The full-screen window can be converted into the small window based on the first conversion parameter by:

reading graphic buffer data associated with the first application;

converting the read graphic buffer data based on the first conversion parameter;

generating frame buffer data for the touch display unit based on the graphic buffer data; and displaying the small window for the first application on the touch display unit based on the frame buffer data.

Here the graphic buffer data may include coordinate information of each pixel and RGB (Red Green Blue) information of each pixel.

Since small windows associated with respective applications may partly overlap each other, the coordinate information of each pixel in the graphic buffer data for the small window associated with each application can be represented as three dimensional (3D) coordinates $x_o$, $y_o$, $z_o$). Here, different small windows have different third dimension coordinates $z_o$. Thus, when two small windows overlap each other partly or even completely, they can be distinguished based their different third dimension coordinates.

The first conversion parameter may be a matrix, e.g., a unit matrix. The small window for the first application can be obtained by converting the extended 3D coordinates $x_o$, $y_o$, $z_o$) in the graphic buffer data based on the first conversion parameter. The graphic buffer data associated with the small window includes the converted coordinates $x_o$, $y_o$, $z_o$) and the RGB information for the respective pixels.

In this way, the full-screen window can be converted into the small window based on the conversion matrix, so as to provide the user with the small window associated with the application and enable the user to view the content of the application executed in any small window flexibly.

Preferably, various adjustments can be applied to a small window by adjusting the conversion matrix associated with the small window.

For example, in order to scale down a small window by a factor of N, where N is an integer larger than 1, the conversion matrix associated with the small window can be changed into $$\begin{pmatrix} 1/N & 0 & 0 \\ 0 & 1/N & 0 \\ 0 & 0 & 1/N \end{pmatrix}$$

in response. In this case, the 3D coordinates $x_t$, $y_t$, $z_t$) of the individual pixels in the frame buffer data associated with the small window will become:

$$x_t, y_t, z_t) = \begin{pmatrix} 1/N & 0 & 0 \\ 0 & 1/N & 0 \\ 0 & 0 & 1/N \end{pmatrix} \times \begin{pmatrix} x_o \\ y_o \\ z_o \end{pmatrix}.$$

Then, in order to further move the small window by $\Delta x$ laterally and by $\Delta y$ longitudinally, the conversion matrix associated with the small window can be changed into $$\begin{pmatrix} 1/N & 0 & \Delta x \\ 0 & 1/N & \Delta y \\ 0 & 0 & 1/N \end{pmatrix}.$$

In this case, the 3D coordinates $x_t$, $y_t$, $z_t$) of the individual pixels in the frame buffer data associated with the small window will become:

$$x_t, y_t, z_t) = \begin{pmatrix} 1/N & 0 & \Delta x \\ 0 & 1/N & \Delta y \\ 0 & 0 & 1/N \end{pmatrix} \times \begin{pmatrix} x_o \\ y_o \\ z_o \end{pmatrix}.$$

In an embodiment, the size of the small window can be configured by changing the first conversion parameter as desired.

There are various settings for the parameter, matrix, parameter group and parameter set and the details thereof will be omitted here.

In an implementation, the electronic device further includes a processor for converting the full-screen window into the small window based on the first conversion parameter. The electronic device may include one or more processors and multiple functional units for implementing various functions can be integrated into a single processor. These functional units include the touch display unit 101 and the processing unit 106.

The touch display unit 101 is further configured to receive a second operation for creating the first predetermined list or a third operation for creating the second predetermined list.

The creating unit 107 is configured to parse the second operation or the third operation to determine M1 applications specified by the second operation or M2 applications specified by the third operation; record the specified M1 applications to form the first predetermined list, wherein each of the M1 applications, when initiated, is to be displayed in a small window by default; or record the specified M2 applications to form the second predetermined list, wherein each of the M2 applications, when initiated, is to be displayed in a full-screen window by default, where M1 and M2 are integers.

15$^{th}$ Embodiment

According to this embodiment, an electronic device is provided, as shown in FIG. 9. The electronic device is capable of executing a first application. The electronic device includes a touch display unit 101 and a processing unit 106.

The touch display unit 101 is configured to display at least one target object associated with the first application and initiate and display the first application in a small window or a full-screen window in response to the target object being touched. The full-screen window has a display area equal to an area where the touch display unit can accept a touch event and the small window has a display area smaller than the area where the touch display unit can accept a touch event. The small window is obtained by converting the full-screen window based on a first conversion parameter.

The touch display unit 101 is further configured to receive a first operation for initiating the first application.

The processing unit 106 is configured to, in response to the first operation, generate and transmit a first trigger instruction to the touch display unit when the first application meets a first predetermined condition and generate and transmit a second trigger instruction to the touch display unit when the first application meets a second predetermined condition.

The touch display unit 101 is further configured to display the first application in the small window in response to receiving the first trigger instruction and display the first application in the full-screen window in response to receiving the second trigger instruction.

The hardware structure of the touch display unit 101 may include a touch screen which may have a structure of a liquid crystal touch screen or a Organic Light Emitting Diode (OLED). The touch screen displays the first application under the control of electronic elements such as a printed circuit or any other integrated circuit.

The hardware structure of the processing unit 106 may include a processor, which can be a multi-core or a single-core central processor, digital signal processor, single chip microcomputer or programmable logic array, for determining whether the first application meets the first predetermined condition or the second predetermined condition and generating the first or second trigger instruction based on the determination result to control the touch display unit 101 to open the first application in the full-screen window or in the small window.

The device further includes a creating unit 107 configured to create a first predetermined list including one or more applications to be displayed in the small window, or a second predetermined list including one or more applications to be displayed in the full-screen window.

The processing unit 106 includes a determining module and an instruction generation and transmission module. The determining module is configured to: determine that the first application meets the first predetermined condition when the first application is included in the first predetermined list, and the first application meets the second predetermined condition when the first application is not included in the first predetermined list; or determine that the first application meets the first predetermined condition when the first application is not included in the second predetermined list, and the first application meets the second predetermined condition when the first application is included in the second predetermined list.

The instruction generation and transmission module is configured to transmit the first trigger instruction when the first application meets the first predetermined condition, and to transmit the second trigger instruction when the first application meets the second predetermined condition.

The physical structure of the creating unit 107 depends on the schemes for creating the first or second predetermined list. When the first or second predetermined list is created based on user input, the creating unit 107 includes a human-machine interaction interface for accepting the user input. The creating unit further includes: a processor for receiving the user input and generating the first or second predetermined list based on the user input; and a storage medium for storing the first or second predetermined list generated by the processor.

The determining module of the processing unit 106 can search the first or second predetermined list for an application identification number or application name of the first application, so as to determine whether the first application is included in the first or second predetermined list. The physical structure of the determining module may also include a processor or an integrated circuit or electronic element for implementing the comparing and determining functions.

The instruction generation and transmission module of the processing unit 106 is connected with the determining module for receiving the determination result of the determining module, generating the first or second trigger instruction based on the determining result and transmitting it to the touch display unit 101. Here, the physical structure of the instruction generation and transmission module may also include a processor and a structure such as a communication interface or a connection bus. Here the processor is configured to generate the first or second trigger instruction based on the determination result. The communication interface or the connection bus is connected with the determining module and the touch display unit 101 and configured to receive the determination result and transmit the first or second trigger instruction. In an implementation, the determining module and the instruction generation and transmission module may be functional modules having different processing functions and integrated into a single processor.

The touch display unit 101 is further configured to display, upon receiving the first operation, a selection dialog box for a user to select to display the first application in a small window or a full-screen window; and receive a fourth operation for selecting a window for displaying the first application in the selection dialog box.

The creating unit 107 is further configured to edit the first or second predetermined list in response to the fourth operation, so as to add/remove the first application to/from the first or second predetermined list. The operation that can be performed by the creating unit 107 include removing the first application from the first predetermined list, adding the first application to the first predetermined list, removing the first application from the second predetermined list, and adding the first application to the second predetermined list.

Here, the first conversion parameter may be one of a single parameter value, a matrix, a parameter group or a parameter set. The parameter may be a single parameter value, e.g., a ratio of the display area of the small window to the display area of the full-screen window. The parameter group may be a two-tuple that includes two parameters, one being a ratio of the small window to the full-screen window in a first direction and the other being a ratio of the small window to the full-screen window in a second direction perpendicular to the first direction.

The full-screen window can be converted into the small window based on the first conversion parameter by:

reading graphic buffer data associated with the first application;

converting the read graphic buffer data based on the first conversion parameter;

generating frame buffer data for the touch display unit based on the graphic buffer data; and displaying the small window for the first application on the touch display unit based on the frame buffer data.

Here the graphic buffer data may include coordinate information of each pixel and RGB (Red Green Blue) information of each pixel.

Since small windows associated with respective applications may partly overlap each other, the coordinate information of each pixel in the graphic buffer data for the small window associated with each application can be represented as three dimensional (3D) coordinates $x_o$, $y_o$, $z_o$). Here, different small windows have different third dimension coordinates $z_o$. Thus, when two small windows overlap each other partly or even completely, they can be distinguished based their different third dimension coordinates.

The first conversion parameter may be a matrix, e.g., a unit matrix. The small window for the first application can be obtained by converting the extended 3D coordinates $x_o$, $y_o$, $z_o$) in the graphic buffer data based on the first conversion parameter. The graphic buffer data associated with the small window includes the converted coordinates $x_o$, $y_o$, $z_o$) and the RGB information for the respective pixels.

In this way, the full-screen window can be converted into the small window based on the conversion matrix, so as to provide the user with the small window associated with the application and enable the user to view the content of the application executed in any small window flexibly.

Preferably, various adjustments can be applied to a small window by adjusting the conversion matrix associated with the small window.

For example, in order to scale down a small window by a factor of N, where N is an integer larger than 1, the conversion matrix associated with the small window can be changed into $$\begin{pmatrix} 1/N & 0 & 0 \\ 0 & 1/N & 0 \\ 0 & 0 & 1/N \end{pmatrix}$$

in response. In this case, the 3D coordinates $x_t$, $y_t$, $z_t$) of the individual pixels in the frame buffer data associated with the small window will become:

$$x_t, y_t, z_t) = \begin{pmatrix} 1/N & 0 & 0 \\ 0 & 1/N & 0 \\ 0 & 0 & 1/N \end{pmatrix} \times \begin{pmatrix} x_o \\ y_o \\ z_o \end{pmatrix}.$$

Then, in order to further move the small window by $\Delta x$ laterally and by $\Delta y$ longitudinally, the conversion matrix associated with the small window can be changed into $$\begin{pmatrix} 1/N & 0 & \Delta x \\ 0 & 1/N & \Delta y \\ 0 & 0 & 1/N \end{pmatrix}.$$

In this case, the 3D coordinates $x_t$, $y_t$, $z_t$) of the individual pixels in the frame buffer data associated with the small window will become:

$$x_t, y_t, z_t) = \begin{pmatrix} 1/N & 0 & \Delta x \\ 0 & 1/N & \Delta y \\ 0 & 0 & 1/N \end{pmatrix} \times \begin{pmatrix} x_o \\ y_o \\ z_o \end{pmatrix}.$$

In an embodiment, the size of the small window can be configured by changing the first conversion parameter as desired.

There are various settings for the parameter, matrix, parameter group and parameter set and the details thereof will be omitted here.

In an implementation, the electronic device further includes a processor for converting the full-screen window into the small window based on the first conversion parameter. The electronic device may include one or more processors and multiple functional units for implementing various functions can be integrated into a single processor. These functional units include the touch display unit 101 and the processing unit 106.

The electronic device according to this embodiment differs from the electronic device according to the 14$^{th}$ embodiment in that the creating unit 107 in this embodiment can not only create the first and second predetermined lists before receiving the first operation, but also establish the first and second predetermined conditions after receiving the first operation. Further, the display window for the first operation can be changed timely according to the user's requirement, thereby further improving the user experience.

16$^{th}$ Embodiment

According to this embodiment, an electronic device is provided, as shown in FIG. 9. The electronic device is capable of executing a first application. The electronic device includes a touch display unit 101 and a processing unit 106.

The touch display unit 101 is configured to display at least one target object associated with the first application and initiate and display the first application in a small window or a full-screen window in response to the target object being touched. The full-screen window has a display area equal to an area where the touch display unit can accept a touch event and the small window has a display area smaller than the area where the touch display unit can accept a touch event. The small window is obtained by converting the full-screen window based on a first conversion parameter.

The touch display unit 101 is further configured to receive a first operation for initiating the first application.

The processing unit 106 is configured to, in response to the first operation, generate and transmit a first trigger instruction to the touch display unit when the first application meets a first predetermined condition and generate and transmit a second trigger instruction to the touch display unit when the first application meets a second predetermined condition.

The touch display unit 101 is further configured to display the first application in the small window in response to receiving the first trigger instruction and display the first application in the full-screen window in response to receiving the second trigger instruction.

The hardware structure of the touch display unit 101 may include a touch screen which may have a structure of a liquid crystal touch screen or a Organic Light Emitting Diode (OLED). The touch screen displays the first application under the control of electronic elements such as a printed circuit or any other integrated circuit.

The hardware structure of the processing unit 106 may include a processor, which can be a multi-core or a single-core central processor, digital signal processor, single chip microcomputer or programmable logic array, for determining whether the first application meets the first predetermined condition or the second predetermined condition and generating the first or second trigger instruction based on the determination result to control the touch display unit 101 to open the first to application in the full-screen window or in the small window.

The device further includes a creating unit 107 configured to create a first predetermined list including one or more applications to be displayed in the small window, or a second predetermined list including one or more applications to be displayed in the full-screen window.

The processing unit 106 includes a determining module and an instruction generation and transmission module. The determining module is configured to: determine that the first application meets the first predetermined condition when the first application is included in the first predetermined list, and the first application meets the second predetermined condition when the first application is not included in the first predetermined list; or determine that the first application meets the first predetermined condition when the first application is not included in the second predetermined list, and the first application meets the second predetermined condition when the first application is included in the second predetermined list.

The instruction generation and transmission module is configured to transmit the first trigger instruction when the first application meets the first predetermined condition, and to transmit the second trigger instruction when the first application meets the second predetermined condition.

The physical structure of the creating unit 107 depends on the schemes for creating the first or second predetermined list. When the first or second predetermined list is created based on user input, the creating unit 107 includes a human-machine interaction interface for accepting the user input. The creating unit further includes: a processor for receiving the user input and generating the first or second predetermined list based on the user input; and a storage medium for storing the first or second predetermined list generated by the processor. The first predetermined list includes a default sub-list including one or more applications to be displayed in a small window by default. The default sub-list is a set of applications suitable to be displayed in a small window. The applications suitable to be displayed in a small window can be added directly to the default sub-list without the user's manual operation. In this way, the user operation can be further simplified and the device may become more intelligent.

The determining module of the processing unit 106 can search the first or second predetermined list for an application identification number or application name of the first application, so as to determine whether the first application is included in the first or second predetermined list. The physical structure of the determining module may also include a processor or an integrated circuit or electronic element for implementing the comparing and determining functions.

The instruction generation and transmission module of the processing unit 106 is connected with the determining module for receiving the determination result of the determining module, generating the first or second trigger instruction based on the determining result and transmitting it to the touch display unit 101. Here, the physical structure of the instruction generation and transmission module may also include a processor and a structure such as a communication interface or a connection bus. Here the processor is configured to generate the first or second trigger instruction based on the determination result. The communication interface or the connection bus is connected with the determining module and the touch display unit 101 and configured to receive the determination result and transmit the first or second trigger instruction. In an implementation, the determining module and the instruction generation and transmission module may be functional modules having different processing functions and integrated into a single processor.

Here, the first conversion parameter may be one of a single parameter value, a matrix, a parameter group or a parameter set. The parameter may be a single parameter value, e.g., a ratio of the display area of the small window to the display area of the full-screen window. The parameter group may be a two-tuple that includes two parameters, one being a ratio of the small window to the full-screen window in a first direction and the other being a ratio of the small window to the full-screen window in a second direction perpendicular to the first direction.

The full-screen window can be converted into the small window based on the first conversion parameter by:

reading graphic buffer data associated with the first application;

converting the read graphic buffer data based on the first conversion parameter;

generating frame buffer data for the touch display unit based on the graphic buffer data; and displaying the small window for the first application on the touch display unit based on the frame buffer data.

Here the graphic buffer data may include coordinate information of each pixel and RGB (Red Green Blue) information of each pixel.

Since small windows associated with respective applications may partly overlap each other, the coordinate information of each pixel in the graphic buffer data for the small window associated with each application can be represented as three dimensional (3D) coordinates $x_o$, $y_o$, $z_o$. Here, different small windows have different third dimension coordinates $z_o$. Thus, when two small windows overlap each other partly or even completely, they can be distinguished based their different third dimension coordinates.

The first conversion parameter may be a matrix, e.g., a unit matrix. The small window for the first application can be obtained by converting the extended 3D coordinates $x_o$, $y_o$, $z_o$ in the graphic buffer data based on the first conversion parameter. The graphic buffer data associated with the small window includes the converted coordinates $x_o$, $y_o$, $z_o$) and the RGB information for the respective pixels.

In this way, the full-screen window can be converted into the small window based on the conversion matrix, so as to provide the user with the small window associated with the application and enable the user to view the content of the application executed in any small window flexibly.

Preferably, various adjustments can be applied to a small window by adjusting the conversion matrix associated with the small window.

For example, in order to scale down a small window by a factor of N, where N is an integer larger than 1, the conversion matrix associated with the small window can be changed into $$\begin{pmatrix} 1/N & 0 & 0 \\ 0 & 1/N & 0 \\ 0 & 0 & 1/N \end{pmatrix}$$

in response. In this case, the 3D coordinates $x_t$, $y_t$, $z_t$) of the individual pixels in the frame buffer data associated with the small window will become:

$$x_t, y_t, z_t) = \begin{pmatrix} 1/N & 0 & 0 \\ 0 & 1/N & 0 \\ 0 & 0 & 1/N \end{pmatrix} \times \begin{pmatrix} x_o \\ y_o \\ z_o \end{pmatrix}.$$

Then, in order to further move the small window by $\Delta x$ laterally and by $\Delta y$ longitudinally, the conversion matrix associated with the small window can be changed into $$\begin{pmatrix} 1/N & 0 & \Delta x \\ 0 & 1/N & \Delta y \\ 0 & 0 & 1/N \end{pmatrix}.$$

In this case, the 3D coordinates $x_t$, $y_t$, $z_t$) of the individual pixels in the frame buffer data associated with the small window will become:

$$x_t, y_t, z_t) = \begin{pmatrix} 1/N & 0 & \Delta x \\ 0 & 1/N & \Delta y \\ 0 & 0 & 1/N \end{pmatrix} \times \begin{pmatrix} x_o \\ y_o \\ z_o \end{pmatrix}.$$

In an embodiment, the size of the small window can be configured by changing the first conversion parameter as desired.

There are various settings for the parameter, matrix, parameter group and parameter set and the details thereof will be omitted here.

With the electronic device according to this embodiment, it is possible to determine whether to display an opened application in a full-screen window or in a small window based on the application, thereby displaying the application in a user desired or more suitable window. Compared with the conventional electronic device, the user experience can be improved.

17$^{th}$ Embodiment

According to this embodiment, an electronic device is provided, as shown in FIG. 8. The electronic device can be a smart terminal such as a smart phone or a tablet computer. The electronic device is capable of executing a first application. The electronic device includes a touch display unit 101 and a processing unit 106.

The touch display unit 101 is configured to display at least one target object associated with the first application and initiate and display the first application in a small window or a full-screen window in response to the target object being touched. The full-screen window has a display area equal to an area where the touch display unit can accept a touch event and the small window has a display area smaller than the area where the touch display unit can accept a touch event. The small window is obtained by converting the full-screen window based on a first conversion parameter.

The touch display unit 101 is further configured to receive a first operation for initiating and displaying the first application.

The processing unit 106 is configured to, in response to the first operation, generate and transmit a first trigger instruction to the touch display unit when the first operation meets a first predetermined condition and generate and transmit a second trigger instruction to the touch display unit when the first operation meets a second predetermined condition.

The touch display unit 101 is further configured to display the first application in the small window in response to receiving the first trigger instruction and display the first application in the full-screen window in response to receiving the second trigger instruction.

Here, the first conversion parameter may be one of a single parameter value, a matrix, a parameter group or a parameter set. The parameter may be a single parameter value, e.g., a ratio of the display area of the small window to the display area of the full-screen window. The parameter group may be a two-tuple that includes two parameters, one being a ratio of the small window to the full-screen window in a first direction and the other being a ratio of the small window to the full-screen window in a second direction perpendicular to the first direction.

The full-screen window can be converted into the small window based on the first conversion parameter by:

reading graphic buffer data associated with the first application;

converting the read graphic buffer data based on the first conversion parameter;

generating frame buffer data for the touch display unit based on the graphic buffer data; and displaying the small window for the first application on the touch display unit based on the frame buffer data.

Here the graphic buffer data may include coordinate information of each pixel and RGB (Red Green Blue) information of each pixel.

Since small windows associated with respective applications may partly overlap each other, the coordinate information of each pixel in the graphic buffer data for the small window associated with each application can be represented as three dimensional (3D) coordinates $x_o, y_o, z_o$. Here, different small windows have different third dimension coordinates $z_o$. Thus, when two small windows overlap each other partly or even completely, they can be distinguished based their different third dimension coordinates.

The first conversion parameter may be a matrix, e.g., a unit matrix. The small window for the first application can be obtained by converting the extended 3D coordinates $x_o, y_o, z_o$ in the graphic buffer data based on the first conversion parameter. The graphic buffer data associated with the small window includes the converted coordinates $x_o, y_o, z_o$) and the RGB information for the respective pixels.

In this way, the full-screen window can be converted into the small window based on the conversion matrix, so as to provide the user with the small window associated with the application and enable the user to view the content of the application executed in any small window flexibly.

Preferably, various adjustments can be applied to a small window by adjusting the conversion matrix associated with the small window.

For example, in order to scale down a small window by a factor of N, where N is an integer larger than 1, the conversion matrix associated with the small window can be changed into $$\begin{pmatrix} 1/N & 0 & 0 \\ 0 & 1/N & 0 \\ 0 & 0 & 1/N \end{pmatrix}$$

in response. In this case, the 3D coordinates $x_t, y_t, z_t$) of the individual pixels in the frame buffer data associated with the small window will become:

$$x_t, y_t, z_t) = \begin{pmatrix} 1/N & 0 & 0 \\ 0 & 1/N & 0 \\ 0 & 0 & 1/N \end{pmatrix} \times \begin{pmatrix} x_o \\ y_o \\ z_o \end{pmatrix}.$$

Then, in order to further move the small window by $\Delta x$ laterally and by $\Delta y$ longitudinally, the conversion matrix associated with the small window can be changed into $$\begin{pmatrix} 1/N & 0 & \Delta x \\ 0 & 1/N & \Delta y \\ 0 & 0 & 1/N \end{pmatrix}.$$

In this case, the 3D coordinates $x_t, y_t, z_t$) of the individual pixels in the frame buffer data associated with the small window will become:

$$x_t, y_t, z_t) = \begin{pmatrix} 1/N & 0 & \Delta x \\ 0 & 1/N & \Delta y \\ 0 & 0 & 1/N \end{pmatrix} \times \begin{pmatrix} x_o \\ y_o \\ z_o \end{pmatrix}.$$

In an embodiment, the size of the small window can be configured by changing the first conversion parameter as desired.

There are various settings for the parameter, matrix, parameter group and parameter set and the details thereof will be omitted here.

The hardware structure of the touch display unit 101 may include a touch screen which may have a structure of a liquid crystal touch screen or a Organic Light Emitting Diode (OLED). The touch screen displays the first application under the control of electronic elements such as a printed circuit or any other integrated circuit.

The hardware structure of the processing unit 106 may include a processor, which can be a multi-core or a single-core central processor, digital signal processor, single chip microcomputer or programmable logic array, for determining whether the first application meets the first predetermined condition or the second predetermined condition and generating the first or second trigger instruction based on the determination result to control the touch display unit 101 to open the first application in the full-screen window or in the small window.

With the electronic device according to this embodiment, by one input of the first operation, the first application can be opened and at the same time it can be determined whether to open the first application in a full-screen window or a small window. Compared with the conventional electronic device, the user operation can be simplified and the user experience can be improved.

18$^{th}$ Embodiment

According to this embodiment, an electronic device is provided, as shown in FIG. 8. The electronic device can be a smart terminal such as a smart phone or a tablet computer. The electronic device is capable of executing a first application. The electronic device includes a touch display unit 101 and a processing unit 106.

The touch display unit 101 is configured to display at least one target object associated with the first application and initiate and display the first application in a small window or a full-screen window in response to the target object being touched. The full-screen window has a display area equal to an area where the touch display unit can accept a touch event and the small window has a display area smaller than the area where the touch display unit can accept a touch event. The small window is obtained by converting the full-screen window based on a first conversion parameter.

The touch display unit 101 is further configured to receive a first operation for to initiating and displaying the first application.

The processing unit 106 is configured to, in response to the first operation, generate and transmit a first trigger instruction to the touch display unit when the first operation meets a first predetermined condition and generate and transmit a second trigger instruction to the touch display unit when the first operation meets a second predetermined condition.

The touch display unit 101 is further configured to display the first application in the small window in response to receiving the first trigger instruction and display the first application in the full-screen window in response to receiving the second trigger instruction.

The processing unit 106 includes a first sensor module configured to detect a duration during which the target object is touched by the first operation; a first judging module configured to judge whether the duration is longer than a first predetermined value; and a first determining module configured to determine that the first operation meets the first predetermined condition when the duration is longer than the first predetermined value, and to determine that the first operation meets the second predetermined condition when the duration is equal to or shorter than the first predetermined value.

The physical structure of the first sensor module may include a timer connected to the touch display unit and configured to start timing when the first operation is applied to the target object and stop timing when the first operation stops being applied to the target object. Here the first operation is typically a single operation applied to the target object.

The structure of the first judging module can include a comparator, a comparing circuit or a processor having a comparing function for comparing the duration detected by the first sensor module with the first predetermined value.

The structure of the first determining module can include a processor connected to the first judging module and configured to receive the judgment result of the first judging module via a communication interface or a transmission line connected with the first judging module and then determine whether the first operation meets the first or second predetermined condition based on the judgment result.

Here, the first conversion parameter may be one of a single parameter value, a matrix, a parameter group or a parameter set. The parameter may be a single parameter value, e.g., a ratio of the display area of the small window to the display area of the full-screen window. The parameter group may be a two-tuple that includes two parameters, one being a ratio of the small window to the full-screen window in a first direction and the other being a ratio of the small window to the full-screen window in a second direction perpendicular to the first direction.

The full-screen window can be converted into the small window based on the first conversion parameter by:

reading graphic buffer data associated with the first application;

converting the read graphic buffer data based on the first conversion parameter;

generating frame buffer data for the touch display unit based on the graphic buffer data; and displaying the small window for the first application on the touch display unit based on the frame buffer data.

Here the graphic buffer data may include coordinate information of each pixel and RGB (Red Green Blue) information of each pixel.

Since small windows associated with respective applications may partly overlap each other, the coordinate information of each pixel in the graphic buffer data for the small window associated with each application can be represented as three dimensional (3D) coordinates $x_o$, $y_o$, $z_o$). Here, different small windows have different third dimension coordinates $z_o$. Thus, when two small windows overlap each other partly or even completely, they can be distinguished based their different third dimension coordinates.

The first conversion parameter may be a matrix, e.g., a unit matrix. The small window for the first application can be obtained by converting the extended 3D coordinates $x_o$, $y_o$, $z_o$) in the graphic buffer data based on the first conversion parameter. The graphic buffer data associated with the small window includes the converted coordinates $x_o$, $y_o$, $z_o$) and the RGB information for the respective pixels.

In this way, the full-screen window can be converted into the small window based on the conversion matrix, so as to provide the user with the small window associated with the application and enable the user to view the content of the application executed in any small window flexibly.

Preferably, various adjustments can be applied to a small window by adjusting the conversion matrix associated with the small window.

For example, in order to scale down a small window by a factor of N, where N is an integer larger than 1, the conversion matrix associated with the small window can be changed into $$\begin{pmatrix} 1/N & 0 & 0 \\ 0 & 1/N & 0 \\ 0 & 0 & 1/N \end{pmatrix}$$

in response. In this case, the 3D coordinates $x_f$, $y_f$, $z_f$) of the individual pixels in the frame buffer data associated with the small window will become:

$$(x_t, y_t, z_t) = \begin{pmatrix} 1/N & 0 & 0 \\ 0 & 1/N & 0 \\ 0 & 0 & 1/N \end{pmatrix} \times \begin{pmatrix} x_o \\ y_o \\ z_o \end{pmatrix}.$$

Then, in order to further move the small window by $\Delta x$ laterally and by $\Delta y$ longitudinally, the conversion matrix associated with the small window can be changed into $$\begin{pmatrix} 1/N & 0 & \Delta x \\ 0 & 1/N & \Delta y \\ 0 & 0 & 1/N \end{pmatrix}.$$

In this case, the 3D coordinates $x_t$, $y_t$, $z_t$) of the individual pixels in the frame buffer data associated with the small window will become:

$$(x_t, y_t, z_t) = \begin{pmatrix} 1/N & 0 & \Delta x \\ 0 & 1/N & \Delta y \\ 0 & 0 & 1/N \end{pmatrix} \times \begin{pmatrix} x_o \\ y_o \\ z_o \end{pmatrix}.$$

In an embodiment, the size of the small window can be configured by changing the first conversion parameter as desired.

There are various settings for the parameter, matrix, parameter group and parameter set and the details thereof will be omitted here.

The electronic device according to this embodiment provides a hardware solution for implementing the information processing method according to the 7$^{th}$ embodiment. Compared with the conventional electronic device, the user experience can be improved.

19$^{th}$ Embodiment

According to this embodiment, an electronic device is provided, as shown in FIG. 8. The electronic device can be a smart terminal such as a smart phone or a tablet computer. The electronic device is capable of executing a first application. The electronic device includes a touch display unit 101 and a processing unit 106.

The touch display unit 101 is configured to display at least one target object associated with the first application and initiate and display the first application in a small window or a full-screen window in response to the target object being touched. The full-screen window has a display area equal to an area where the touch display unit can accept a touch event and the small window has a display area smaller than the area where the touch display unit can accept a touch event. The small window is obtained by converting the full-screen window based on a first conversion parameter.

The touch display unit 101 is further configured to receive a first operation for initiating and displaying the first application.

The processing unit 106 is configured to, in response to the first operation, generate and transmit a first trigger instruction to the touch display unit when the first operation meets a first predetermined condition and generate and transmit a second trigger instruction to the touch display unit when the first operation meets a second predetermined condition.

The touch display unit 101 is further configured to display the first application in the small window in response to receiving the first trigger instruction and display the first application in the full-screen window in response to receiving the second trigger instruction.

The processing unit 106 includes a second sensor module configured to detect a number of times the target object is touched by the first operation during a predetermined time period; a second judging module configured to judge whether the number of times is equal to m or n; and a second determining module configured to determine that the first operation meets the first predetermined condition when the number of times is equal to m, and to determine that the first operation meets the second predetermined condition when the number of times is to equal to n, where m and n are different integers.

The physical structure of the second sensor module may include a counter connected to the touch display unit and configured to count the number of times the target object is touched by the first operation during the predetermined time period.

The structure of the second judging module can include a comparator, a comparing circuit or a processor having a comparing function for comparing the number of times the target object is touched as detected by the second sensor module with m or n.

The structure of the second determining module can include a processor connected to the second judging module and configured to receive the judgment result of the second judging module via a communication interface or a transmission line connected with the second judging module and then determine whether the first operation meets the first or second predetermined condition based on the judgment result.

Here, the first conversion parameter may be one of a single parameter value, a matrix, a parameter group or a parameter set. The parameter may be a single parameter value, e.g., a ratio of the display area of the small window to the display area of the full-screen window. The parameter group may be a two-tuple that includes two parameters, one being a ratio of the small window to the full-screen window in a first direction and the other being a ratio of the small window to the full-screen window in a second direction perpendicular to the first direction.

The full-screen window can be converted into the small window based on the first conversion parameter by:

reading graphic buffer data associated with the first application;

converting the read graphic buffer data based on the first conversion parameter;

generating frame buffer data for the touch display unit based on the graphic buffer data; and displaying the small window for the first application on the touch display unit based on the frame buffer data.

Here the graphic buffer data may include coordinate information of each pixel and RGB (Red Green Blue) information of each pixel.

Since small windows associated with respective applications may partly overlap each other, the coordinate information of each pixel in the graphic buffer data for the small window associated with each application can be represented as three dimensional (3D) coordinates $x_o$, $y_o$, $z_o$). Here, different small windows have different third dimension coordinates $z_o$. Thus, when two small windows overlap each other partly or even completely, they can be distinguished based their different third dimension coordinates.

The first conversion parameter may be a matrix, e.g., a unit matrix. The small window for the first application can be obtained by converting the extended 3D coordinates $x_o$, $y_o$, $z_o$) in the graphic buffer data based on the first conversion parameter. The graphic buffer data associated with the small window includes the converted coordinates $x_o$, $y_o$, $z_o$) and the RGB information for the respective pixels.

In this way, the full-screen window can be converted into the small window based on the conversion matrix, so as to provide the user with the small window associated with the application and enable the user to view the content of the application executed in any small window flexibly.

Preferably, various adjustments can be applied to a small window by adjusting the conversion matrix associated with the small window.

For example, in order to scale down a small window by a factor of N, where N is an integer larger than 1, the conversion matrix associated with the small window can be changed into $$\begin{pmatrix} 1/N & 0 & 0 \\ 0 & 1/N & 0 \\ 0 & 0 & 1/N \end{pmatrix}$$

in response. In this case, the 3D coordinates $x_t$, $y_t$, $z_t$) of the individual pixels in the frame buffer data associated with the small window will become:

$$x_t, y_t, z_t) = \begin{pmatrix} 1/N & 0 & 0 \\ 0 & 1/N & 0 \\ 0 & 0 & 1/N \end{pmatrix} \times \begin{pmatrix} x_o \\ y_o \\ z_o \end{pmatrix}.$$

Then, in order to further move the small window by $\Delta x$ laterally and by $\Delta y$ longitudinally, the conversion matrix associated with the small window can be changed into $$\begin{pmatrix} 1/N & 0 & \Delta x \\ 0 & 1/N & \Delta y \\ 0 & 0 & 1/N \end{pmatrix}.$$

In this case, the 3D coordinates $x_t$, $y_t$, $z_t$) of the individual pixels in the frame buffer data associated with the small window will become:

$$x_t, y_t, z_t) = \begin{pmatrix} 1/N & 0 & \Delta x \\ 0 & 1/N & \Delta y \\ 0 & 0 & 1/N \end{pmatrix} \times \begin{pmatrix} x_o \\ y_o \\ z_o \end{pmatrix}.$$

In an embodiment, the size of the small window can be configured by changing the first conversion parameter as desired.

There are various settings for the parameter, matrix, parameter group and parameter set and the details thereof will be omitted here.

The electronic device according to this embodiment provides a hardware solution for implementing the information processing method according to the 8$^{th}$ embodiment. Compared with the conventional electronic device, the user experience can be improved.

20$^{th}$ Embodiment

According to this embodiment, an electronic device is provided, as shown in FIG. 8. The electronic device can be a smart terminal such as a smart phone or a tablet computer. The electronic device is capable of executing a first application. The electronic device includes a touch display unit 101 and a processing unit 106.

The touch display unit 101 is configured to display at least one target object associated with the first application and initiate and display the first application in a small window or a full-screen window in response to the target object being touched. The full-screen window has a display area equal to an area where the touch display unit can accept a touch event and the small window has a display area smaller than the area where the touch display unit can accept a touch event. The small window is obtained by converting the full-screen window based on a first conversion parameter.

The touch display unit 101 is further configured to receive a first operation for initiating and displaying the first application.

The processing unit 106 is configured to, in response to the first operation, generate and transmit a first trigger instruction to the touch display unit when the first operation meets a first predetermined condition and generate and transmit a second trigger instruction to the touch display unit when the first operation meets a second predetermined condition.

The touch display unit 101 is further configured to display the first application in the small window in response to receiving the first trigger instruction and display the first application in the full-screen window in response to receiving the second trigger instruction.

Here, the target object includes a first region and a second region. The processing unit 106 includes: a third sensor module configured to detect a region touched by the first operation; a third judging module configured to judge whether the touched region is included in the first region or the second region; and a third determining unit configured to determine that the first operation meets the first predetermined condition when the touched region is included in the first region, and to determine that first operation meets the second predetermined condition when the touched region is included in the second region.

In particular, as shown in FIG. 6, the target object 104 includes a first region 1041 and a second region 1042 that does not overlap the first region 1041. In an implementation, the first region 1041 and the second region 1042 may overlap each other. For example, the first region can be a part of the region of the target object and the second region can be the entire region of the target object. In this case, when the third sensor module detects that the first operation touches a region included in the first region, it is determined that the first operation meets the first predetermined condition. When the first operation touches a region that is at least partly outside the first region, it is determined that the first operation meets the second predetermined condition.

The physical structure of the third sensor module may include a locator connected to the touch display unit and configured to determine the region in the target object that is touched by the first operation during a predetermined time period. In particular, the locator may determine the region touched by the first operation based on pixels touched by the first operation.

The structure of the third judging module can include a comparator, a comparing circuit or a processor having a comparing function for judging whether the region touched by the first operation is included in the first region or the second region.

The structure of the third determining module can include a processor connected to the third judging module and configured to receive the judgment result of the third judging module via a communication interface or a transmission line connected with the third judging module and then determine whether the first operation meets the first or second predetermined condition based on the judgment result.

Here, the first conversion parameter may be one of a single parameter value, a matrix, a parameter group or a parameter set. The parameter may be a single parameter value, e.g., a ratio of the display area of the small window to the display area of the full-screen window. The parameter group may be a two-tuple that includes two parameters, one being a ratio of the small window to the full-screen window in a first direction and the other being a ratio of the small window to the full-screen window in a second direction perpendicular to the first direction.

The full-screen window can be converted into the small window based on the first conversion parameter by:

reading graphic buffer data associated with the first application;

converting the read graphic buffer data based on the first conversion parameter;

generating frame buffer data for the touch display unit based on the graphic buffer data; and displaying the small window for the first application on the touch display unit based on the frame buffer data.

Here the graphic buffer data may include coordinate information of each pixel and RGB (Red Green Blue) information of each pixel.

Since small windows associated with respective applications may partly overlap each other, the coordinate information of each pixel in the graphic buffer data for the small window associated with each application can be represented as three dimensional (3D) coordinates $x_o$, $y_o$, $z_o$). Here, different small windows have different third dimension coordinates $z_o$. Thus, when two small windows overlap each other partly or even completely, they can be distinguished based their different third dimension coordinates.

The first conversion parameter may be a matrix, e.g., a unit matrix. The small window for the first application can be obtained by converting the extended 3D coordinates $x_o$, $y_o$, $z_o$) in the graphic buffer data based on the first conversion parameter. The graphic buffer data associated with the small window includes the converted coordinates $x_o$, $y_o$, $z_o$) and the RGB information for the respective pixels.

In this way, the full-screen window can be converted into the small window based on the conversion matrix, so as to provide the user with the small window associated with the application and enable the user to view the content of the application executed in any small window flexibly.

Preferably, various adjustments can be applied to a small window by adjusting the conversion matrix associated with the small window.

For example, in order to scale down a small window by a factor of N, where N is an integer larger than 1, the conversion matrix associated with the small window can be changed into $$\begin{pmatrix} 1/N & 0 & 0 \\ 0 & 1/N & 0 \\ 0 & 0 & 1/N \end{pmatrix}$$

in response. In this case, the 3D coordinates $x_t$, $y_t$, $z_t$) of the individual pixels in the frame buffer data associated with the small window will become:

$$x_t, y_t, z_t) = \begin{pmatrix} 1/N & 0 & 0 \\ 0 & 1/N & 0 \\ 0 & 0 & 1/N \end{pmatrix} \times \begin{pmatrix} x_o \\ y_o \\ z_o \end{pmatrix}.$$

Then, in order to further move the small window by $\Delta x$ laterally and by $\Delta y$ longitudinally, the conversion matrix associated with the small window can be changed into $$\begin{pmatrix} 1/N & 0 & \Delta x \\ 0 & 1/N & \Delta y \\ 0 & 0 & 1/N \end{pmatrix}.$$

In this case, the 3D coordinates $x_t$, $y_t$, $z_t$) of the individual pixels in the frame buffer data associated with the small window will become:

$$x_t, y_t, z_t) = \begin{pmatrix} 1/N & 0 & \Delta x \\ 0 & 1/N & \Delta y \\ 0 & 0 & 1/N \end{pmatrix} \times \begin{pmatrix} x_o \\ y_o \\ z_o \end{pmatrix}.$$

In an embodiment, the size of the small window can be configured by changing the first conversion parameter as desired.

There are various settings for the parameter, matrix, parameter group and parameter set and the details thereof will be omitted here.

The electronic device according to this embodiment provides a hardware solution for implementing the information processing method according to the $9^{th}$ embodiment. Compared with the conventional electronic device, the user experience can be improved.

$21^{st}$ Embodiment

According to this embodiment, an electronic device is provided, as shown in FIG. 8. The electronic device can be a smart terminal such as a smart phone or a tablet computer. The electronic device is capable of executing a first application. The electronic device includes a touch display unit 101 and a processing unit 106.

The touch display unit 101 is configured to display at least one target object associated with the first application and initiate and display the first application in a small window or a full-screen window in response to the target object being touched. The full-screen window has a display area equal to an area where the touch display unit can accept a touch event and the small window has a display area smaller than the area where the touch display unit can accept a touch event. The small window is obtained by converting the full-screen window based on a first conversion parameter.

The touch display unit 101 is further configured to receive a first operation for initiating and displaying the first application.

The processing unit 106 is configured to, in response to the first operation, generate and transmit a first trigger instruction to the touch display unit when the first operation meets a first predetermined condition and generate and transmit a second trigger instruction to the touch display unit when the first operation meets a second predetermined condition.

The touch display unit 101 is further configured to display the first application in the small window in response to receiving the first trigger instruction and display the first application in the full-screen window in response to receiving the second trigger instruction.

Here, the first operation is a sliding touch operation on the target object. The processing unit 106 includes: a fourth sensor module configured to detect a sliding direction of the first operation; a fourth judging module configured to judge whether the sliding direction is a first direction or a second direction different from the first direction; and a fourth determining unit configured to determine that the first operation meets the first predetermined condition when the sliding direction is the first direction, and to determine that the first operation meets the second predetermined condition when the sliding direction is the second direction.

The physical structure of the fourth sensor module may include a processor connected to the touch display unit and configured to determine the sliding direction of the first operation.

The structure of the fourth judging module can include a comparator, a comparing circuit or a processor having a comparing function for comparing the sliding direction with the predetermined first and second directions, so as to determine the sliding direction of the first operation.

The structure of the fourth determining module can include a processor connected to the fourth judging module and configured to receive the judgment result of the fourth judging module via a communication interface or a transmission line connected with the fourth judging module and then determine whether the first operation meets the first or second predetermined condition based on the judgment result.

In an implementation, the processing unit can be a single-core or a multi-core processor that can be divided logically into a number of functional modules having their respective functions, such as the fourth sensor module, the four judging module and the fourth determining module.

Here, the first conversion parameter may be one of a single parameter value, a matrix, a parameter group or a parameter set. The parameter may be a single parameter value, e.g., a ratio of the display area of the small window to the display area of the full-screen window. The parameter group may be a two-tuple that includes two parameters, one being a ratio of the small window to the full-screen window in a first direction and the other being a ratio of the small window to the full-screen window in a second direction perpendicular to the first direction.

The full-screen window can be converted into the small window based on the first conversion parameter by:

reading graphic buffer data associated with the first application;

converting the read graphic buffer data based on the first conversion parameter;

generating frame buffer data for the touch display unit based on the graphic buffer data; and displaying the small window for the first application on the touch display unit based on the frame buffer data.

Here the graphic buffer data may include coordinate information of each pixel and RGB (Red Green Blue) information of each pixel.

Since small windows associated with respective applications may partly overlap each other, the coordinate information of each pixel in the graphic buffer data for the small window associated with each application can be represented as three dimensional (3D) coordinates $x_o$, $y_o$, $z_o$). Here, different small windows have different third dimension coordinates $z_o$. Thus, when two small windows overlap each other partly or even completely, they can be distinguished based their different third dimension coordinates.

The first conversion parameter may be a matrix, e.g., a unit matrix. The small window for the first application can be obtained by converting the extended 3D coordinates $x_o$, $y_o$, $z_o$) in the graphic buffer data based on the first conversion parameter. The graphic buffer data associated with the small window includes the converted coordinates $x_o$, $y_o$, $z_o$) and the RGB information for the respective pixels.

In this way, the full-screen window can be converted into the small window based on the conversion matrix, so as to provide the user with the small window associated with the application and enable the user to view the content of the application executed in any small window flexibly.

Preferably, various adjustments can be applied to a small window by adjusting the conversion matrix associated with the small window.

For example, in order to scale down a small window by a factor of N, where N is an integer larger than 1, the conversion matrix associated with the small window can be changed into $$\begin{pmatrix} 1/N & 0 & 0 \\ 0 & 1/N & 0 \\ 0 & 0 & 1/N \end{pmatrix}$$

in response. In this case, the 3D coordinates $x_t$, $y_t$, $z_t$) of the individual pixels in the frame buffer data associated with the small window will become:

$$x_t, y_t, z_t) = \begin{pmatrix} 1/N & 0 & 0 \\ 0 & 1/N & 0 \\ 0 & 0 & 1/N \end{pmatrix} \times \begin{pmatrix} x_o \\ y_o \\ z_o \end{pmatrix}.$$

Then, in order to further move the small window by $\Delta x$ laterally and by $\Delta y$ longitudinally, the conversion matrix associated with the small window can be changed into $$\begin{pmatrix} 1/N & 0 & \Delta x \\ 0 & 1/N & \Delta y \\ 0 & 0 & 1/N \end{pmatrix}.$$

In this case, the 3D coordinates $x_t$, $y_t$, $z_t$) of the individual pixels in the frame buffer data associated with the small window will become:

$$x_t, y_t, z_t) = \begin{pmatrix} 1/N & 0 & \Delta x \\ 0 & 1/N & \Delta y \\ 0 & 0 & 1/N \end{pmatrix} \times \begin{pmatrix} x_o \\ y_o \\ z_o \end{pmatrix}.$$

In an embodiment, the size of the small window can be configured by changing the first conversion parameter as desired.

There are various settings for the parameter, matrix, parameter group and parameter set and the details thereof will be omitted here.

The electronic device according to this embodiment provides a hardware solution for implementing the information processing method according to the 10$^{th}$ embodiment. Compared with the conventional electronic device, the user experience can be improved.

22$^{nd}$ Embodiment

According to this embodiment, an electronic device is provided, as shown in FIG. 8. The electronic device can be a smart terminal such as a smart phone or a tablet computer. The electronic device is capable of executing a first application. The electronic device includes a touch display unit 101 and a processing unit 106.

The touch display unit 101 is configured to display at least one target object associated with the first application and initiate and display the first application in a small window or a full-screen window in response to the target object being touched. The full-screen window has a display area equal to an area where the touch display unit can accept a touch event and the small window has a display area smaller than the area where the touch display unit can accept a touch event. The small window is obtained by converting the full-screen window based on a first conversion parameter.

The touch display unit 101 is further configured to receive a first operation for to initiating and displaying the first application.

The processing unit 106 is configured to, in response to the first operation, generate and transmit a first trigger instruction to the touch display unit when the first operation meets a first predetermined condition and generate and transmit a second trigger instruction to the touch display unit when the first operation meets a second predetermined condition.

The touch display unit 101 is further configured to display the first application in the small window in response to receiving the first trigger instruction and display the first application in the full-screen window in response to receiving the second trigger instruction.

Here, the first operation is a pressing touch operation on the target object. The processing unit 106 includes: a fifth sensor module configured to detect a pressure of the first operation; a fifth judging module configured to judge whether the pressure is higher than a third predetermined value; and a fifth determining unit configured to determine that the first operation meets the first predetermined condition when the pressure is higher than the third predetermined value, and to determine that the first operation meets the second predetermined condition when the pressure is equal to or lower than the third predetermined value.

In particular, the fifth sensor module can be one or more pressure sensors distributed over the touch sensitive region of the touch display unit 101 and configured to detect the pressure of the first operation.

The structure of the fifth judging module can include a comparator, a comparing circuit or a processor having a comparing function for comparing the detected pressure with the pre-stored third predetermined value.

The structure of the fifth determining module can include a processor connected to the fifth judging module and configured to receive the judgment result of the fifth judging module via a communication interface or a transmission line connected with the fifth judging module and then determine whether the first operation meets the first or second predetermined condition based on the judgment result.

Here, the first conversion parameter may be one of a single parameter value, a matrix, a parameter group or a parameter set. The parameter may be a single parameter value, e.g., a ratio of the display area of the small window to the display area of the full-screen window. The parameter group may be a two-tuple that includes two parameters, one being a ratio of the small window to the full-screen window in a first direction and the other being a ratio of the small window to the full-screen window in a second direction perpendicular to the first direction.

The full-screen window can be converted into the small window based on the first conversion parameter by:

reading graphic buffer data associated with the first application;

converting the read graphic buffer data based on the first conversion parameter;

generating frame buffer data for the touch display unit based on the graphic buffer data; and displaying the small window for the first application on the touch display unit based on the frame buffer data.

Here the graphic buffer data may include coordinate information of each pixel and RGB (Red Green Blue) information of each pixel.

Since small windows associated with respective applications may partly overlap each other, the coordinate information of each pixel in the graphic buffer data for the small window associated with each application can be represented as three dimensional (3D) coordinates $x_o$, $y_o$, $z_o$). Here, different small windows have different third dimension coordinates $z_o$. Thus, when two small windows overlap each other partly or even completely, they can be distinguished based their different third dimension coordinates.

The first conversion parameter may be a matrix, e.g., a unit matrix. The small window for the first application can be obtained by converting the extended 3D coordinates $x_o$, $y_o$, $z_o$) in the graphic buffer data based on the first conversion parameter. The graphic buffer data associated with the small window includes the converted coordinates $x_o$, $y_o$, $z_o$) and the RGB information for the respective pixels.

In this way, the full-screen window can be converted into the small window based on the conversion matrix, so as to provide the user with the small window associated with the application and enable the user to view the content of the application executed in any small window flexibly.

Preferably, various adjustments can be applied to a small window by adjusting the conversion matrix associated with the small window.

For example, in order to scale down a small window by a factor of N, where N is an integer larger than 1, the conversion matrix associated with the small window can be changed into $$\begin{pmatrix} 1/N & 0 & 0 \\ 0 & 1/N & 0 \\ 0 & 0 & 1/N \end{pmatrix}$$

in response. In this case, the 3D coordinates $x_t$, $y_t$, $z_t$) of the individual pixels in the frame buffer data associated with the small window will become:

$$(x_t, y_t, z_t) = \begin{pmatrix} 1/N & 0 & 0 \\ 0 & 1/N & 0 \\ 0 & 0 & 1/N \end{pmatrix} \times \begin{pmatrix} x_o \\ y_o \\ z_o \end{pmatrix}.$$

Then, in order to further move the small window by $\Delta x$ laterally and by $\Delta y$ longitudinally, the conversion matrix associated with the small window can be changed into $$\begin{pmatrix} 1/N & 0 & \Delta x \\ 0 & 1/N & \Delta y \\ 0 & 0 & 1/N \end{pmatrix}.$$

In this case, the 3D coordinates $x_t$, $y_t$, $z_t$) of the individual pixels in the frame buffer data associated with the small window will become:

$$x_t, y_t, z_t) = \begin{pmatrix} 1/N & 0 & \Delta x \\ 0 & 1/N & \Delta y \\ 0 & 0 & 1/N \end{pmatrix} \times \begin{pmatrix} x_o \\ y_o \\ z_o \end{pmatrix}.$$

In an embodiment, the size of the small window can be configured by changing the first conversion parameter as desired.

There are various settings for the parameter, matrix, parameter group and parameter set and the details thereof will be omitted here.

The electronic device according to this embodiment provides a hardware solution for implementing the information processing method according to the 11$^{th}$ embodiment. Compared with the conventional electronic device, the user experience can be improved.

With the electronic devices according to the 17$^{th}$ to 22$^{nd}$ embodiments, by one user operation, i.e., the first operation, for opening the first application, the first application can be opened and at the same time it can be determined whether to open the first application in a full-screen window or a small window. Compared with the conventional electronic device, the user operation can be simplified and the user experience can be improved.

23$^{rd}$ Embodiment

Figure 10:
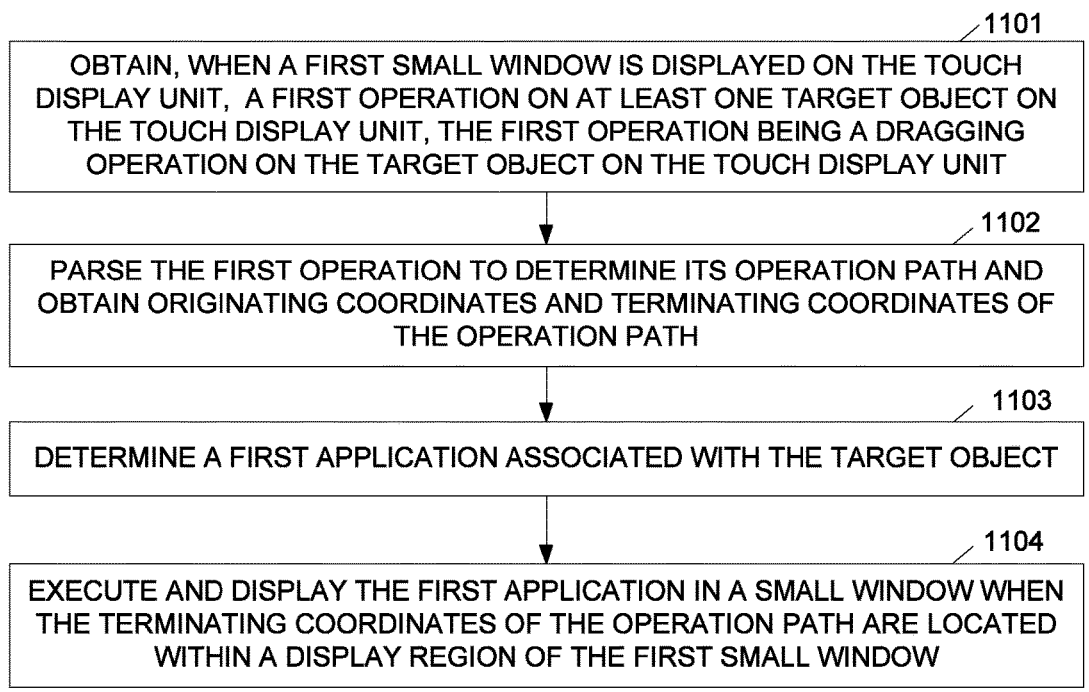
FIG. 10 is another flowchart illustrating an information processing method according to an embodiment of the present invention.

According to this embodiment, an information processing method is provided. The method is applied in an electronic device (e.g., a tablet computer or a smart phone) having a touch display unit and capable of executing a plurality of applications. The touch display unit is capable of displaying M target objects each associated with one of M applications, where M is a positive integer. An application is initiated when its associated target object is touched. Each application can be displayed in a full-screen window or a small window on the touch display unit. The small window has a smaller display area than the full-screen window. The small window is obtained by converting the full-screen window based on a first conversion parameter. As shown in FIG. 10, the method includes the following steps.

A step 1101, when a first small window is displayed on the touch display unit, a first operation on at least one target object on the touch display unit is obtained. The first operation is a dragging operation on the target object on the touch display unit.

At step 1102, the first operation is parsed to determine its operation path and obtain originating coordinates and terminating coordinates of the operation path.

At step 1103, a first application associated with the target object is determined.

At step 1104, the first application is executed and displayed in a small window when the terminating coordinates of the operation path are located within a display region of the first small window.

Preferably, there may or may not be an application running in the first small window in the step 1101.

Preferably, the target object can be an icon associated with the application or hyperlink information.

Preferably, the first operation can be a sliding operation of the user's finger in which the finger currently positioned at the target object slides to a target position.

The step of parsing the first operation to determine its operation path and obtain originating coordinates and terminating coordinates of the operation path can be done in a conventional way, including recording the originating coordinates, coordinates of motion path and terminating coordinates of the first operation.

The step of determining a first application associated with the target object can be done in a conventional way. For example, when the target object is an icon and the user performs the first operation on the icon, the first application can be determined based on the icon.

Preferably, the step of executing and displaying the first application in a small window when the terminating coordinates of the operation path are located within a display region of the first small window further includes: opening a second small window directly at the terminating coordinates and executing and displaying the first application in the second small window when the terminating coordinates of the operation path are not located within a display region of the first small window.

Figure 11:
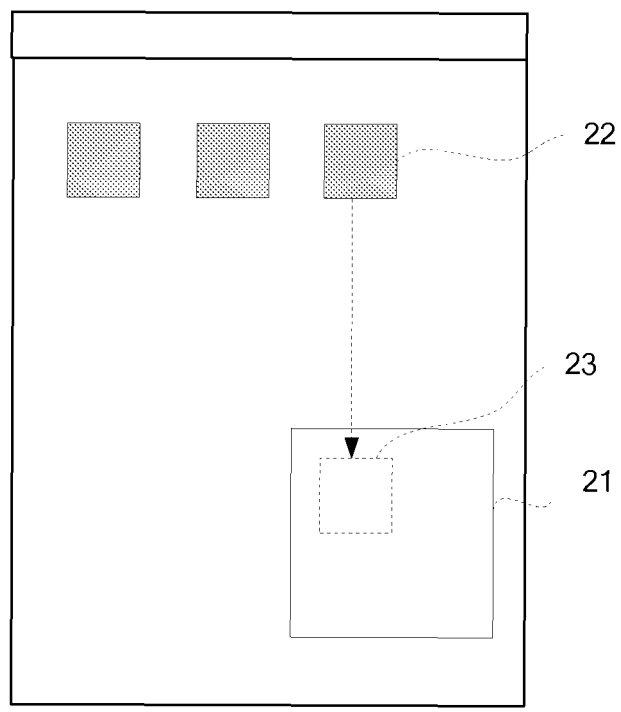
FIG. 11 is a schematic diagram showing a first operation for dragging a target object according to an embodiment of the present invention.

In the following, the application scenario of this embodiment will be explained. As shown in FIG. 11, it is assumed that a first small window 21 is currently displayed on the touch display unit and there are icons each corresponding to one of a plurality of applications on the desktop of the touch display unit.

When the user selects one of the target objects 22 and drags it to the position 23, the electronic device obtains the first operation and parses the first operation to determine the operation path of the user operation on the target object 22 and obtain the originating coordinates and the terminating coordinates of the operation path.

The electronic device then determines the application associated with the target object as the first application. For example, when the target object is an icon of an application "PPS Video", the first application is the application "PPS Video".

Then, the first application is executed and displayed in the small window.

It can be seen that with the solution according to this embodiment, the user is provided with a new approach for initiating an application, i.e., initiating an application directly in a small window at a position specified by the users operation. In this way, operations such as selecting an initiating mode and selecting a position to open a small window can be omitted, thereby ensuring operation convenience, improving operation efficiency and enhancing user experience.

24$^{th}$ Embodiment

According to this embodiment, an information processing method is provided. The method is applied in an electronic device (e.g., a tablet computer or a smart phone) having a touch display unit and capable of executing a plurality of applications. The touch display unit is capable of displaying M target objects each associated with one of M applications, where M is a positive integer. An application is initiated when its associated target object is touched. Each application can be displayed in a full-screen window or a small window on the touch display unit. The small window has a smaller display area than the full-screen window. The small window is obtained by converting the full-screen window based on a first conversion parameter. As shown in FIG. 10, the method includes the following steps.

A step 1101, when a first small window is displayed on the touch display unit, a first operation on at least one target object on the touch display unit is obtained. The first operation is a dragging operation on the target object on the touch display unit.

At step 1102, the first operation is parsed to determine its operation path and obtain originating coordinates and terminating coordinates of the operation path.

At step 1103, a first application associated with the target object is determined.

At step 1104, the first application is executed and displayed in a small window when the terminating coordinates of the operation path are located within a display region of the first small window.

Preferably, there may or may not be an application running in the first small window in the step 1101.

Preferably, the target object can be an icon associated with the application or hyperlink information.

Preferably, the first operation can be a sliding operation of the user's finger in which the finger currently positioned at the target object slides to a target position.

The step of parsing the first operation to determine its operation path and obtain originating coordinates and terminating coordinates of the operation path can be done in a conventional way, including recording the originating coordinates, coordinates of motion path and terminating coordinates of the first operation.

The step of determining a first application associated with the target object can be done in a conventional way. For example, when the target object is an icon and the user performs the first operation on the icon, the first application can be determined based on the icon.

Figure 12:
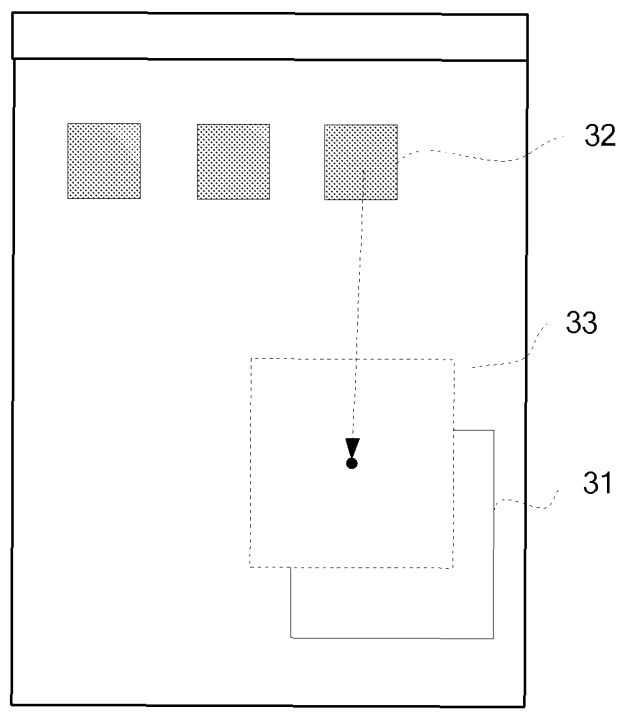
FIG. 12 is a schematic diagram showing a second operation for dragging a target object according to an embodiment of the present invention.

Preferably, the step of executing and displaying the first application in a small window further includes: opening a second small window directly at the terminating coordinates and executing and displaying the first application in the second small window. For example, as shown in FIG. 12, a second small window 33 is opened for executing the first application 32. Alternatively, the first application can be executed and displayed in the first small window.

Preferably, the conversion parameter at least comprises one of a single parameter value, a conversion matrix, a parameter group or a parameter set.

In the following, the application scenario of this embodiment will be explained. As shown in FIG. 11, it is assumed that a first small window 21 is currently displayed on the touch display unit and there are icons each corresponding to one of a plurality of applications on the desktop of the touch display unit.

When the user selects one of the target objects 22 and drags it to the position 23, the electronic device obtains the first operation and parses the first operation to determine the operation path of the user operation on the target object 22 and obtain the originating coordinates and the terminating coordinates of the operation path.

The electronic device then determines the application associated with the target object as the first application. For example, when the target object is an icon of an application "PPS Video", the first application is the application "PPS Video".

Then, the first application is executed and displayed in the first or second small window, depending on the user's setting or selection.

It can be seen that with the solution according to this embodiment, the user is provided with a new approach for initiating an application, i.e., initiating an application directly in a small window at a position specified by the users operation. In this way, operations such as selecting an initiating mode and selecting a position to open a small window can be omitted, thereby ensuring operation convenience, improving operation efficiency and enhancing user experience. In addition, the solution according to this embodiment can provide a number of approaches for initiating an application, including opening a new window for executing a selected application, so as to avoid any impact on operations in currently active windows.

25$^{th}$ Embodiment

According to this embodiment, an information processing method is provided. The method is applied in an electronic device (e.g., a tablet computer or a smart phone) having a touch display unit and capable of executing a plurality of applications. The touch display unit is capable of displaying M target objects each associated with one of M applications, where M is a positive integer. An application is initiated when its associated target object is touched. Each application can be displayed in a full-screen window or a small window on the touch display unit. The small window has a smaller display area than the full-screen window. The small window is obtained by converting the full-screen window based on a first conversion parameter. As shown in FIG. 10, the method includes the following steps.

A step 1101, when a first small window is displayed on the touch display unit, a first operation on at least one target object on the touch display unit is obtained. The first operation is a dragging operation on the target object on the touch display unit.

At step 1102, the first operation is parsed to determine its operation path and obtain originating coordinates and terminating coordinates of the operation path.

At step 1103, a first application associated with the target object is determined.

At step 1104, the first application is executed and displayed in a small window when the terminating coordinates of the operation path are located within a display region of the first small window.

Preferably, there may or may not be an application running in the first small window in the step 1101.

Preferably, the target object can be an icon associated with the application or hyperlink information.

Preferably, the first operation can be a sliding operation of the user's finger in which the finger currently positioned at the target object slides to a target position.

The step of parsing the first operation to determine its operation path and obtain originating coordinates and terminating coordinates of the operation path can be done in a conventional way, including recording the originating coordinates, coordinates of motion path and terminating coordinates of the first operation.

The step of determining a first application associated with the target object can be done in a conventional way. For example, when the target object is an icon and the user performs the first operation on the icon, the first application can be determined based on the icon.

Preferably, the step of executing and displaying the first application further includes: opening a second small window directly at the terminating coordinates and executing and displaying the first application in the second small window. For example, as shown in FIG. 12, a second small window 33 is opened for executing the first application 32. Alternatively, the first application can be executed and displayed in the first small window.

The method further includes, prior to said displaying the first application in the small window on the touch display unit: determining whether the electronic device is in a first operation mode where an application can only be executed in one active window at a time in the electronic device.

Figure 13:
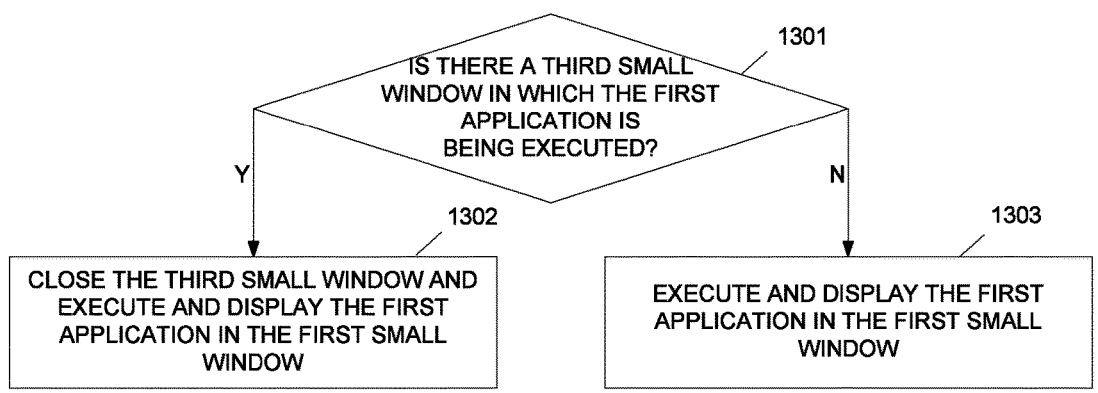
FIG. 13 is a flowchart illustrating an information processing method according to another embodiment of the present invention.

After determining whether the electronic device is in the first operation mode, the step of executing and displaying the first application includes the following steps, as shown in FIG. 13.

At step 1301, when the electronic device is in the first operation mode, it is determined whether there is a third small window in which the first application is being executed. When it is determined that there is a third small window in which the first application is being executed, the method proceeds with step 1302; otherwise the method proceeds with step 1303.

At step 1302, the third small window is closed and the first application is executed and displayed in the first small window.

At step 1303, the first application is executed and displayed in the first small window.

Preferably, the step of executing and displaying the first application in a small window further includes: executing and displaying the first application in the first small window when it is judged that the electronic device is not in the first operation mode.

Preferably, the conversion parameter at least comprises one of a single parameter value, a conversion matrix, a parameter group or a parameter set.

In the following, the application scenario of this embodiment will be explained. As shown in FIG. 11, it is assumed that a first small window 21 is currently displayed on the touch display unit and there are icons each corresponding to one of a plurality of applications on the desktop of the touch display unit.

When the user selects one of the target objects 22 and drags it to the position 23, the electronic device obtains the first operation and parses the first operation to determine the operation path of the user operation on the target object 22 and obtain the originating coordinates and the terminating coordinates of the operation path.

The electronic device then determines the application associated with the target object as the first application. For example, when the target object is an icon of an application "PPS Video", the first application is the application "PPS Video".

It is determined whether the electronic device is in the first operation mode.

When the electronic device is in the first operation mode, it is determined whether there is a third small window in the electronic device in which the application "PPS Video" is currently being executed. If so, the third small window is closed and the application "PPS Video" being executed in the third small window is terminated. Then, the application "PPS Video" can be executed and displayed in the first small window.

It can be seen that with the solution according to this embodiment, the user is provided with a new approach for initiating an application, i.e., initiating an application directly in a small window at a position specified by the users operation. In this way, operations such as selecting an initiating mode and selecting a position to open a small window can be omitted, thereby ensuring operation convenience, improving operation efficiency and enhancing user experience. In addition, with the solution of this embodiment, it is possible to determine whether a single application can be executed in more than one window based on the user selected operation mode of the electronic device. In this way, multiple windows can be opened without exceeding the operation capacity of the electronic device and without degrading the user experience.

26$^{th}$ Embodiment

According to this embodiment, an electronic device is provided. As shown in FIG. 8, the electronic device includes a touch display unit 101 and a processing unit 106.

The touch display unit 101 is configured to display M target objects each associated with one of M applications in a display region, where M is a positive integer. An application is initiated when its associated target object is touched. Each application can be displayed in a full-screen window or a small window on the touch display unit. The small window has a smaller display area than the full-screen window. The small window is obtained by converting the full-screen window based on a first conversion parameter. When a first small window is displayed on the touch display unit, a first operation on at least one target object is obtained. The first operation is a dragging operation on the target object.

The processing unit 106 is configured to: parse the first operation to determine its operation path and obtain originating coordinates and terminating coordinates of the operation path; determine a first application associated with the target object; and generate and transmit a first trigger instruction to the touch display unit 101 when the terminating coordinates of the operation path are located within a display region of the first small window.

The touch display unit 101 is configured to display the first application in the small window in response to receiving the first trigger instruction and to display the first application in the full-screen window in response to receiving the second trigger instruction.

There may or may not be an application running in the first small window.

Preferably, the target object can be an icon associated with the application or hyperlink information.

Preferably, the first operation can be a sliding operation of the user's finger in which the finger currently positioned at the target object slides to a target position.

The step of parsing the first operation to determine its operation path and obtain originating coordinates and terminating coordinates of the operation path can be done in a conventional way, including recording the originating coordinates, coordinates of motion path and terminating coordinates of the first operation.

The step of determining a first application associated with the target object can be done in a conventional way. For example, when the target object is an icon and the user performs the first operation on the icon, the first application can be determined based on the icon.

Preferably, the processing unit is further configured to generate and transmit a fourth trigger instruction to the touch display unit when the terminating coordinates of the operation path are not located within a display region of the first small window. The touch display unit is configured to open a second small window at the terminating coordinates and executing and displaying the first application in the second small window in response to receiving the fourth trigger instruction.

In the following, the application scenario of this embodiment will be explained. As shown in FIG. 11, it is assumed that a first small window 21 is currently displayed on the touch display unit and there are icons each corresponding to one of a plurality of applications on the desktop of the touch display unit.

When the user selects one of the target objects 22 and drags it to the position 23, the electronic device obtains the first operation and parses the first operation to determine the operation path of the user operation on the target object 22 and obtain the originating coordinates and the terminating coordinates of the operation path.

The processing unit then determines the application associated with the target object as the first application. For example, when the target object is an icon of an application "PPS Video", the first application is the application "PPS Video".

Then, the first application is executed and displayed in the small window.

It can be seen that with the solution according to this embodiment, the user is provided with a new approach for initiating an application, i.e., initiating an application directly in a small window at a position specified by the users operation. In this way, operations such as selecting an initiating mode and selecting a position to open a small window can be omitted, thereby ensuring operation convenience, improving operation efficiency and enhancing user experience.

27th Embodiment

According to this embodiment, an electronic device is provided. As shown in FIG. 8, the electronic device includes a touch display unit 101 and a processing unit 106.

The touch display unit 101 is configured to display M target objects each associated with one of M applications in a display region, where M is a positive integer. An application is initiated when its associated target object is touched. Each application can be displayed in a full-screen window or a small window on the touch display unit. The small window has a smaller display area than the full-screen window. The small window is obtained by converting the full-screen window based on a first conversion parameter. When a first small window is displayed on the touch display unit, a first operation on at least one target object is obtained. The first operation is a dragging operation on the target object.

The processing unit 106 is configured to: parse the first operation to determine its operation path and obtain originating coordinates and terminating coordinates of the operation path; determine a first application associated with the target object; and generate and transmit a first trigger instruction to the touch display unit 101 when the terminating coordinates of the operation path are located within a display region of the first small window.

The touch display unit 101 is configured to display the first application in the small window in response to receiving the first trigger instruction and to display the first application in the full-screen window in response to receiving the second trigger instruction.

There may or may not be an application running in the first small window. Preferably, the target object can be an icon associated with the application or hyperlink information.

Preferably, the first operation can be a sliding operation of the user's finger in which the finger currently positioned at the target object slides to a target position.

The step of parsing the first operation to determine its operation path and obtain originating coordinates and terminating coordinates of the operation path can be done in a conventional way, including recording the originating coordinates, coordinates of motion path and terminating coordinates of the first operation.

The step of determining a first application associated with the target object can be done in a conventional way. For example, when the target object is an icon and the user performs the first operation on the icon, the first application can be determined based on the icon.

Preferably, the processing unit is further configured to generate and transmit a fourth trigger instruction to the touch display unit when the terminating coordinates of the operation path are not located within a display region of the first small window. The touch display unit is configured to open a second small window at the terminating coordinates and executing and displaying the first application in the second small window in response to receiving the fourth trigger instruction.

Preferably, the touch display unit is further configured to open a second small window at the terminating coordinates and execute and display the first application in the second small window. For example, as shown in FIG. 12, a second small window 33 is opened for executing the first application 32. Alternatively, the first application can be executed and displayed in the first small window.

Preferably, the conversion parameter at least comprises one of a single parameter value, a conversion matrix, a parameter group or a parameter set.

In the following, the application scenario of this embodiment will be explained. As shown in FIG. 11, it is assumed that a first small window 21 is currently displayed on the touch display unit and there are icons each corresponding to one of a plurality of applications on the desktop of the touch display unit.

When the user selects one of the target objects 22 and drags it to the position 23, the electronic device obtains the first operation and parses the first operation to determine the operation path of the user operation on the target object 22 and obtain the originating coordinates and the terminating coordinates of the operation path.

The processing unit then determines the application associated with the target object as the first application. For example, when the target object is an icon of an application "PPS Video", the first application is the application "PPS Video".

Then, the processing unit controls the touch display unit to execute and display the first application in the first or second small window, depending on the user's setting or selection.

It can be seen that with the solution according to this embodiment, the user is provided with a new approach for initiating an application, i.e., initiating an application directly in a small window at a position specified by the users operation. In this way, operations such as selecting an initiating mode and selecting a position to open a small window can be omitted, thereby ensuring operation convenience, improving operation efficiency and enhancing user experience. In addition, the solution according to this embodiment can provide a number of approaches for initiating an application, including opening a new window for executing a selected application, so as to avoid any impact on operations in currently active windows.

28th Embodiment

According to this embodiment, an electronic device is provided. As shown in FIG. 8, the electronic device includes a touch display unit 101 and a processing unit 106.

The touch display unit 101 is configured to display M target objects each associated with one of M applications in a display region, where M is a positive integer. An application is initiated when its associated target object is touched. Each application can be displayed in a full-screen window or a small window on the touch display unit. The small window has a smaller display area than the full-screen window. The small window is obtained by converting the full-screen window based on a first conversion parameter. When a first small window is displayed on the touch display unit, a first operation on at least one target object is obtained. The first operation is a dragging operation on the target object.

The processing unit 106 is configured to: parse the first operation to determine its operation path and obtain originating coordinates and terminating coordinates of the operation path; determine a first application associated with the target object;

and generate and transmit a first trigger instruction to the touch display unit 101 when the terminating coordinates of the operation path are located within a display region of the first small window.

The touch display unit 101 is configured to display the first application in the small window in response to receiving the first trigger instruction and to display the first application in the full-screen window in response to receiving the second trigger instruction.

There may or may not be an application running in the first small window.

Preferably, the target object can be an icon associated with the application or hyperlink information.

Preferably, the first operation can be a sliding operation of the user's finger in which the finger currently positioned at the target object slides to a target position.

The step of parsing the first operation to determine its operation path and obtain originating coordinates and terminating coordinates of the operation path can be done in a conventional way, including recording the originating coordinates, coordinates of motion path and terminating coordinates of the first operation.

The step of determining a first application associated with the target object can be done in a conventional way. For example, when the target object is an icon and the user performs the first operation on the icon, the first application can be determined based on the icon.

Preferably, the processing unit is further configured to generate and transmit a fourth trigger instruction to the touch display unit when the terminating coordinates of the operation path are not located within a display region of the first small window. The touch display unit is configured to open a second small window at the terminating coordinates and executing and displaying the first application in the second small window in response to receiving the fourth trigger instruction.

Preferably, the touch display unit is further configured to open a second small window at the terminating coordinates and execute and display the first application in the second small window. For example, as shown in FIG. 12, a second small window 33 is opened for executing the first application 32. Alternatively, the first application can be executed and displayed in the first small window.

The processing unit is configured to, prior to displaying the first application, determine whether the electronic device is in a first operation mode where an application can only be executed in one active window at a time.

The processing unit is configured to, when the electronic device is in the first operation mode: determine whether there is a third small window in which the first application is being executed, when determining that there is a third small window in which the first application is being executed, generate and transmit a third trigger instruction to the touch display unit for causing the touch display unit to close the third small window and executing and displaying the first application in the first small window, and when determining that there is no third small window in which the first application is being executed, generate and transmit the first trigger instruction to the touch display unit for executing and displaying the first application in the first small window.

The processing unit is configured to, when it is determined that the electronic device is not in the first operation mode: generate and transmit the first trigger instruction to the touch display unit for executing and displaying the first application in the first small window.

Preferably, the conversion parameter at least comprises one of a single parameter value, a conversion matrix, a parameter group or a parameter set.

In the following, the application scenario of this embodiment will be explained. As shown in FIG. 11, it is assumed that a first small window 21 is currently displayed on the touch display unit and there are icons each corresponding to one of a plurality of applications on the desktop of the touch display unit.

When the user selects one of the target objects 22 and drags it to the position 23, the electronic device obtains the first operation and parses the first operation to determine the operation path of the user operation on the target object 22 and obtain the originating coordinates and the terminating coordinates of the operation path.

The processing unit then determines the application associated with the target object as the first application. For example, when the target object is an icon of an application "PPS Video", the first application is the application "PPS Video".

It is determined whether the electronic device is in the first operation mode.

When the electronic device is in the first operation mode, it is determined whether there is a third small window in the electronic device in which the application "PPS Video" is currently being executed. If so, the third small window is closed and the application "PPS Video" being executed in the third small window is terminated. Then, the application "PPS Video" can be executed and displayed in the first small window.

It can be seen that with the solution according to this embodiment, the user is provided with a new approach for initiating an application, i.e., initiating an application directly in a small window at a position specified by the users operation. In this way, operations such as selecting an initiating mode and selecting a position to open a small window can be omitted, thereby ensuring operation convenience, improving operation efficiency and enhancing user experience. In addition, with the solution of this embodiment, it is possible to determine whether a single application can be executed in more than one window based on the user selected operation mode of the electronic device. In this way, multiple windows can be opened without exceeding the operation capacity of the electronic device and without degrading the user experience.

It can be appreciated from the embodiments of the present application that the disclosed device and method can be implemented in alternative ways. The device embodiments as described above are illustrative only. For example, while the units have been divided in accordance with their logical functions, other divisions are possible in practice. For example, more than one unit or element can be combined or can be integrated into another system, or some features can be ignored or omitted. In addition, the coupling, direct coupling or communicative connection between various components as shown or discussed can be an indirect coupling or communicative connection via some interface, device or unit and can be electrical, mechanical or in another form.

The units described above as separated may or may not be physically separated. The components shown as units may or may not be physical units. They can be co-located or can be distributed over a number of network elements. Depending on actual requirements, some or all of the units can be selected to achieve the object of the present invention.

Further, all the functional units in various embodiments of the present invention can be integrated within one processing unit, or each of these units can be a separate unit, or two or more units can be integrated into one unit. Such integrated unit can be implemented in hardware, possibly in combination with software functional units.

It can be appreciated by those skilled in the art that some or all of the steps in the method embodiment as described above can be implemented by hardware following instructions of a program. Such program can be stored in a computer readable storage medium and, when executed, performs the steps of the above method embodiment. The storage medium may be any of various mediums capable of storing program codes, such as a mobile storage device, a Read Only Memory (ROM), a Random Access Memory (RAM), a magnetic disk or an optical disc.

When the above integrated units of the present invention are implemented in software functional modules and sold or used as an independent product, they can be stored in a computer readable storage medium. In view of this, the technical solutions according to the embodiments of the present application, or in other words a part thereof which makes contribution over the prior art, can be substantially embodied in a form of software product. The computer software product can be stored in a storage media, such as ROM/RAM, magnetic disk, optical disc and the like, containing instructions which cause a computer device (which can be a personal computer, a server, a network device or the like) to perform one or more methods according to the embodiments of the present application or particular parts thereof.

While the embodiments of the present invention have been described above, the scope of the present invention is not limited thereto. Various modifications and alternatives can be made by those skilled in the art without departing from the scope of the present disclosure. These modifications and alternatives are to be encompassed by the scope of the present invention which is only defined by the claims as attached.

What is claimed is:

1. An information processing method, applied in an electronic device having a touch display unit and capable of executing a first application, the touch display unit being capable of displaying at least one target object associated with the first application and displaying the first application in a small window or a full-screen window in response to the target object being touched, the full-screen window having a display area equal to an area where the touch display unit can accept a touch event and the small window having a display area smaller than the area where the touch display unit can accept a. touch event, the small window being obtained by converting the full-screen window based on a first conversion parameter, the method comprising:
receiving a first operation on the touch display unit for initiating and displaying the first application;
initiating and displaying the first application in the small window on the touch display unit when the first operation meets a first predetermined operation condition; and
initiating and displaying the first application in the full-screen window on the touch display unit when the first operation meets a second predetermined operation condition.

2. The method of claim 1, wherein the first conversion parameter at least comprises one of a single parameter value, a matrix, a parameter group or a parameter set.

3. The method of claim 2, wherein:
the first operation meets the first predetermined operation condition when the target object is touched by the first operation for a duration longer than a first predetermined value, and
the first operation meets the second predetermined operation condition when the target object is touched by the first operation for a duration equal to or shorter than the first predetermined value.

4. The method of claim 2, wherein
the first operation meets the first predetermined operation condition when the target object is touched by the first operation for m times during a predetermined time period, and
the first operation meets the second predetermined operation condition when the target object is touched by the first operation for n times during the predetermined time period,
where m and n are different integers.

5. The method of claim 2, wherein
the target object comprises a first region and a second region, and
wherein the first operation meets the first predetermined operation condition when the first operation touches a region included in the first region, and
wherein the first operation meets the second predetermined operation condition when the first operation touches a region included in the second region.

6. The method of claim 2, wherein
the first operation is a sliding touch operation on the target object, and
wherein the first operation meets the first predetermined operation condition when the first operation slides in a first direction, and
wherein the first operation meets the second predetermined operation condition when the first operation slides in a second direction different from the first direction.

7. The method of claim 2, wherein the electronic device further comprises a pressure sensor, and the first operation is a pressing touch operation on the target object, and
wherein the first operation meets the first predetermined operation condition when the first operation has a pressure higher than a second predetermined value, and
wherein the first operation meets the second predetermined operation condition when the first operation has a pressure equal to or lower than the second predetermined value.

8. The method of claim 2, wherein
the first operation is a dragging operation on the target object, and
wherein the first operation meets the first predetermined operation condition when the first operation has an operation path that terminates at a position located within a display region of a first small window displayed on the touch display unit.

9. The method of claim 8, wherein said initiating and displaying the first application in the small window on the touch display unit comprises:

opening a second small window at the coordinates for executing and displaying the first application, or executing and displaying the first application in the first small window.

10. The method of claim 8, further comprising, prior to said initiating and displaying the first application in the small window on the touch display unit:

determining whether the electronic device is in a first operation mode where an application can only be executed in one active window at a time in the electronic device, and when the electronic device is in the first operation mode:
  determining whether there is a third small window in which the first application is being executed,
  closing, when it is determined that there is a third small window in which the first application is being executed, the third small window, and executing and displaying the first application in the first small window, and
  executing and displaying the first application in the first small window when it is determined that there is no third small window in which the first application is being executed; and when the electronic device is not in the first operation mode:
  executing and displaying the first application in the first small window.

11. An electronic device, capable of executing a first application, the electronic device comprising a touch display unit and a processing unit, wherein the touch display unit is configured to display at least one target object associated with the first application and initiate and display the first application in a small window or a full-screen window in response to the target object being, touched, the fun-screen window having a display area equal to an area where the touch display unit can accept a touch event and the small window having a display area smaller than the area where the touch display unit can accept a touch event, the small window being obtained by converting the full-screen window based on a first conversion parameter, the touch display unit is further configured to receive a first operation for initiating the first application, the processing unit is configured to generate and transmit a first trigger instruction to the touch display unit when the first operation meets a first predetermined operation condition, and is configured to generate and transmit a second trigger instruction to the touch display unit when the first operation meets a second predetermined operation condition, the touch display unit is further configured to initiate and display the first application in the small window in response to receiving the first trigger instruction, and the touch display unit is further configured to initiate and display the first application in the full-screen window in response to receiving the second trigger instruction.

12. The electronic device of claim 11, wherein the first conversion parameter at least comprises one of a single parameter value, a matrix, a parameter group or a parameter set.

13. The electronic device of claim 12, wherein the processing unit comprises:

a first sensor module configured to detect a duration during which the target object is touched by the first operation;

a first judging module configured to judge whether the duration is longer than a first predetermined value; and a first determining module configured to determine that the first operation meets the first predetermined operation condition when the duration is longer than the first predetermined value, and to determine that the first operation meets the second predetermined operation condition when the duration is equal to or shorter than the first predetermined value.

14. The electronic device of claim 12, wherein the processing unit comprises:

a second sensor module configured to detect a number of times the target object is touched by the first operation during a predetermined time period;

a second judging module configured to judge whether the number of times is equal to m or n; and a second determining module configured to determine that the first operation meets the first predetermined operation condition when the number of times is equal to m, and to determine that the first operation meets the second predetermined operation condition when the number of times is equal to n, where m and n are different integers.

15. The electronic device of claim 12, wherein the target object comprises a first region and a second region, and the processing unit comprises:
  a third sensor module configured to detect a region touched by the first operation;
  a third judging module configured to judge whether the touched region is included in the first region or the second region; and a third determining unit configured to determine that the first operation meets the first predetermined operation condition when the touched region is included in the first region, and to determine that first operation meets the second predetermined operation condition when the touched region is included in the second region.

16. The electronic device of claim 12, wherein the first operation is a sliding touch operation on the target object, and wherein the processing unit comprises:
  a fourth sensor module configured to detect a sliding direction of the first operation;
  a fourth judging module configured to judge whether the sliding direction is a first direction or a second direction different from the first direction; and a fourth determining unit configured to determine that the first operation meets the first predetermined operation condition when the sliding direction is the first direction, and to determine that the first operation meets the second predetermined operation condition when the sliding direction is the second direction.

17. The electronic device of claim 12, wherein the first operation is a pressing touch operation on the target object, and wherein the processing unit comprises:
  a fifth sensor module configured to detect a pressure of the first operation;
  a fifth judging module configured to judge whether the pressure is higher than a third predetermined value; and a fifth determining unit configured to determine that the first operation meets the first predetermined operation condition when the pressure is higher than the third predetermined value, and to determine that the first operation meets the second predetermined operation condition when the pressure is equal to or lower than the third predetermined value.

18. The electronic device of claim 12, wherein
the first operation is a dragging operation on the target object, and
wherein the processing unit is configured to generate and transmit the first trigger instruction to the touch display unit when the first operation has an operation path that terminates at a position located within a display region of a first small window displayed on the touch display unit.

19. The electronic device of claim 18, wherein the touch display unit is configured to, in response to receiving the first trigger instruction:
open a second small window at the coordinates for executing and displaying the first application, or
execute and displaying the first application in the first small window.

20. The electronic device of claim 18, wherein the processing unit is configured to:
determine whether the electronic device is in a first operation mode where an application can only be executed in one active window at a time, and
when the electronic device is in the first operation mode:
determine whether there is a third small window in which the first application is being executed,
when determining that there is a third small window in which the first application is being executed, generate and transmit a third trigger instruction to the touch display unit for causing the touch display unit to close the third small window and executing and displaying the first application in the first small window, and
when determining that there is no third small window in which the first application is being executed, generate and transmit the first trigger instruction to the touch display unit for executing and displaying the first application in the first small window, and
when the electronic device is not in the first operation mode:
generate and transmit the first trigger instruction to the touch display unit for executing and displaying the first application in the first small window.

* * * * *

UNITED STATES PATENT AND TRADEMARK OFFICE
CERTIFICATE OF CORRECTION

| | | |
|---|---|---|
| PATENT NO. | : 9,658,734 B2 | Page 1 of 1 |
| APPLICATION NO. | : 14/226052 | |
| DATED | : May 23, 2017 | |
| INVENTOR(S) | : Lijun Lin | |

It is certified that error appears in the above-identified patent and that said Letters Patent is hereby corrected as shown below:

In the Specification

Column 6, Line 5:
Delete "whether to the"
Insert --whether the--

Column 8, Line 9:
Delete "to and"
Insert --and--

Column 48, Line 17:
Delete "first to"
Insert --first--

Column 53, Line 27:
Delete "for to"
Insert --for--

Column 56, Line 12:
Delete "is to equal"
Insert --is equal--

Column 63, Line 20:
Delete "for to"

Signed and Sealed this
Tenth Day of October, 2017

Joseph Matal
*Performing the Functions and Duties of the*
*Under Secretary of Commerce for Intellectual Property and*
*Director of the United States Patent and Trademark Office*